United States Patent [19]

Tanaka

[11] Patent Number: 5,352,081

[45] Date of Patent: Oct. 4, 1994

[54] GOODS HANDLING APPARATUS AND METHOD

[75] Inventor: Nobuhiro Tanaka, Saitama, Japan

[73] Assignee: Kao Corporation, Tokyo, Japan

[21] Appl. No.: 59,877

[22] Filed: May 11, 1993

Related U.S. Application Data

[63] Continuation of Ser. No. 602,113, Oct. 23, 1990, abandoned.

[30] Foreign Application Priority Data

Apr. 27, 1990 [JP] Japan .................................. 2-110399
Apr. 27, 1990 [JP] Japan .................................. 2-110400

[51] Int. Cl.⁵ ............................................. B65G 1/04
[52] U.S. Cl. ........................... 414/266; 414/786;
414/276; 414/404; 211/134; 211/11; 211/12;
211/83; 211/103; 211/174; 186/29; 186/2
[58] Field of Search ................. 414/786, 276, 286, 266,
414/419, 421, 267, 268, 403, 404, 269, 273, 281,
277; 186/55, 69, 2, 29; 211/134; 221/92, 11, 12,
13, 79, 82, 84, 85, 89, 103, 99, 112, 258, 174,
268, 298, 83, 209.1, 68; 364/478

[56] References Cited

U.S. PATENT DOCUMENTS

| | | |
|---|---|---|
| 3,420,336 | 1/1969 | Simjian . |
| 3,800,980 | 4/1974 | Takeuchi et al. . |
| 4,423,827 | 1/1984 | Guigan . |
| 4,492,504 | 1/1985 | Hainsworth ........................ 414/273 |
| 4,678,390 | 7/1987 | Bonneton et al. ............... 414/286 X |
| 4,874,281 | 10/1989 | Bergerioux et al. . |
| 4,971,513 | 11/1990 | Bergerioux et al. . |

FOREIGN PATENT DOCUMENTS

| | | |
|---|---|---|
| 0339610 | 11/1989 | European Pat. Off. . |
| 2303423 | 8/1973 | Fed. Rep. of Germany . |
| 0037989 | 1/1981 | France . |
| 2596299 | 10/1987 | France . |
| 703068 | 4/1966 | Italy ................................... 414/279 |
| 59-88110 | 5/1984 | Japan . |
| 259902 | 11/1987 | Japan ................................. 414/269 |
| 63-175622 | 11/1988 | Japan . |
| 2-8102 | 1/1989 | Japan ................................. 414/268 |
| 1-22805 | 5/1989 | Japan ................................. 414/276 |
| 1-192603 | 8/1989 | Japan . |
| 1-3506 | 1/1990 | Japan ................................. 414/276 |
| 837911 | 6/1960 | United Kingdom ................ 221/11 |

*Primary Examiner*—Frank E. Werner
*Attorney, Agent, or Firm*—Frishauf, Holtz, Goodman & Woodward

[57] ABSTRACT

A plurality of goods contained at random or in a predetermined arrangement, particularly in a three rows or more in a container such as a corrugated fiberboard box and a plastic container, etc., are stored in a goods storage device arranged in no more than two rows and having a plurality of goods storage sections. After the goods have been shifted to a goods drop-out device having a plurality of goods storing sections arranged in no more than two rows, a shutter disposed along a side surface portion of the goods drop-out device is opened and shut by an actuator, so that the goods which have been shifted to the goods storage section of the goods drop-out device are discharged into a goods storage section unit. By shifting the goods stored in a storage apparatus to a goods take-out device which has moved toward the storage apparatus side, a shifting operation of goods can be performed with ease. By reengaging a partition in an engaging portion selected in such a manner as to correspond to the sizes, configurations, etc. of goods, the goods can be effectively stored and many kinds of goods can be reliably taken out.

9 Claims, 44 Drawing Sheets

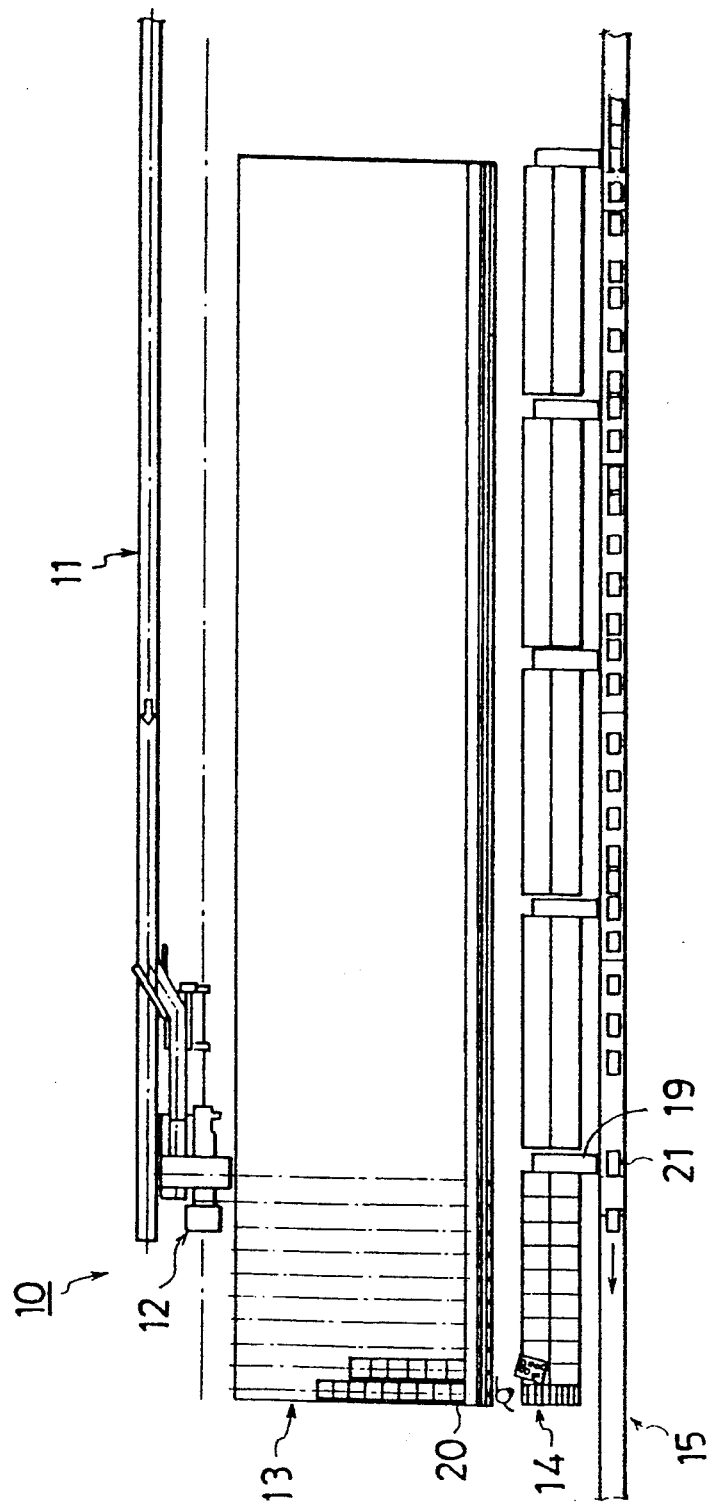

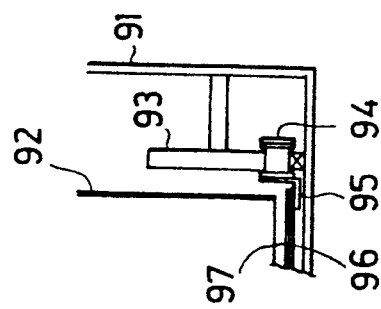
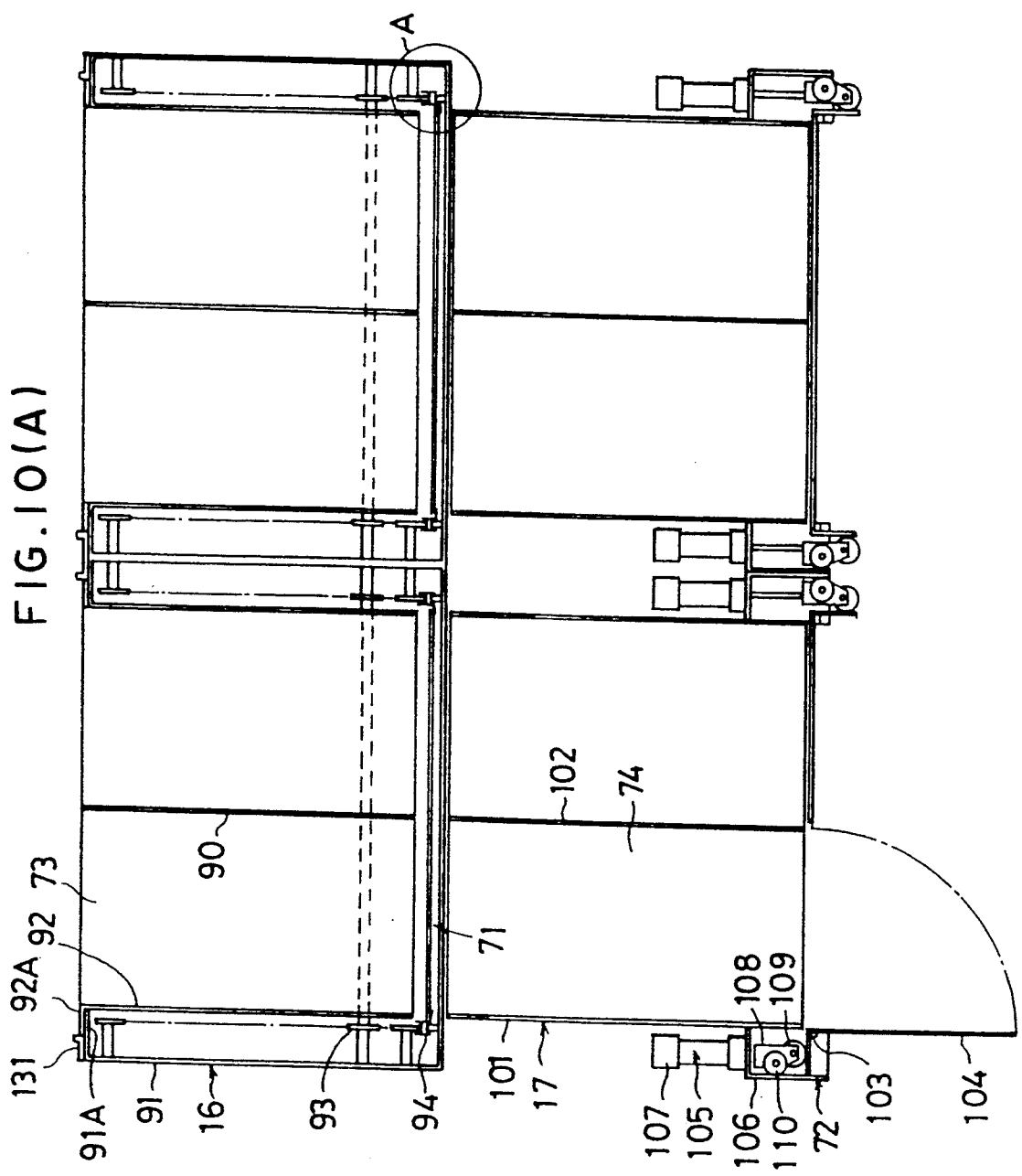

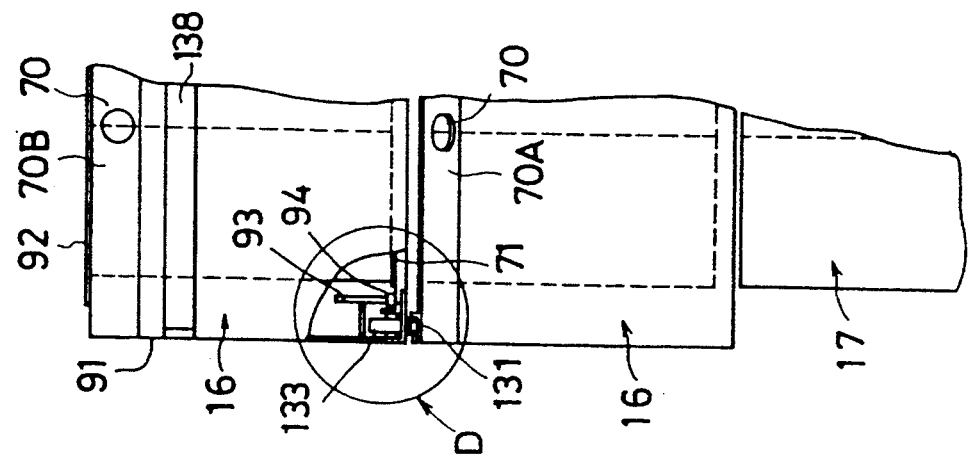
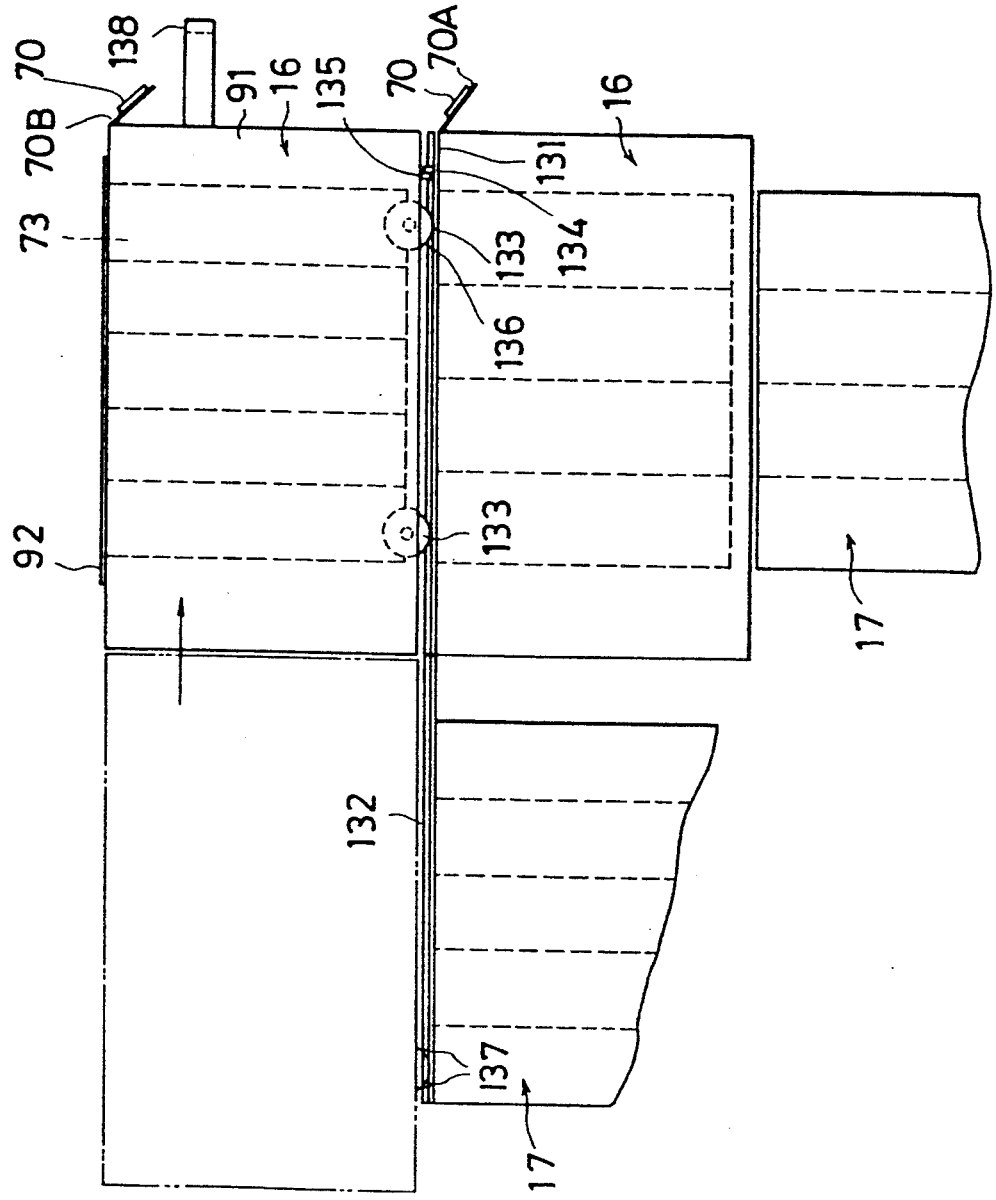

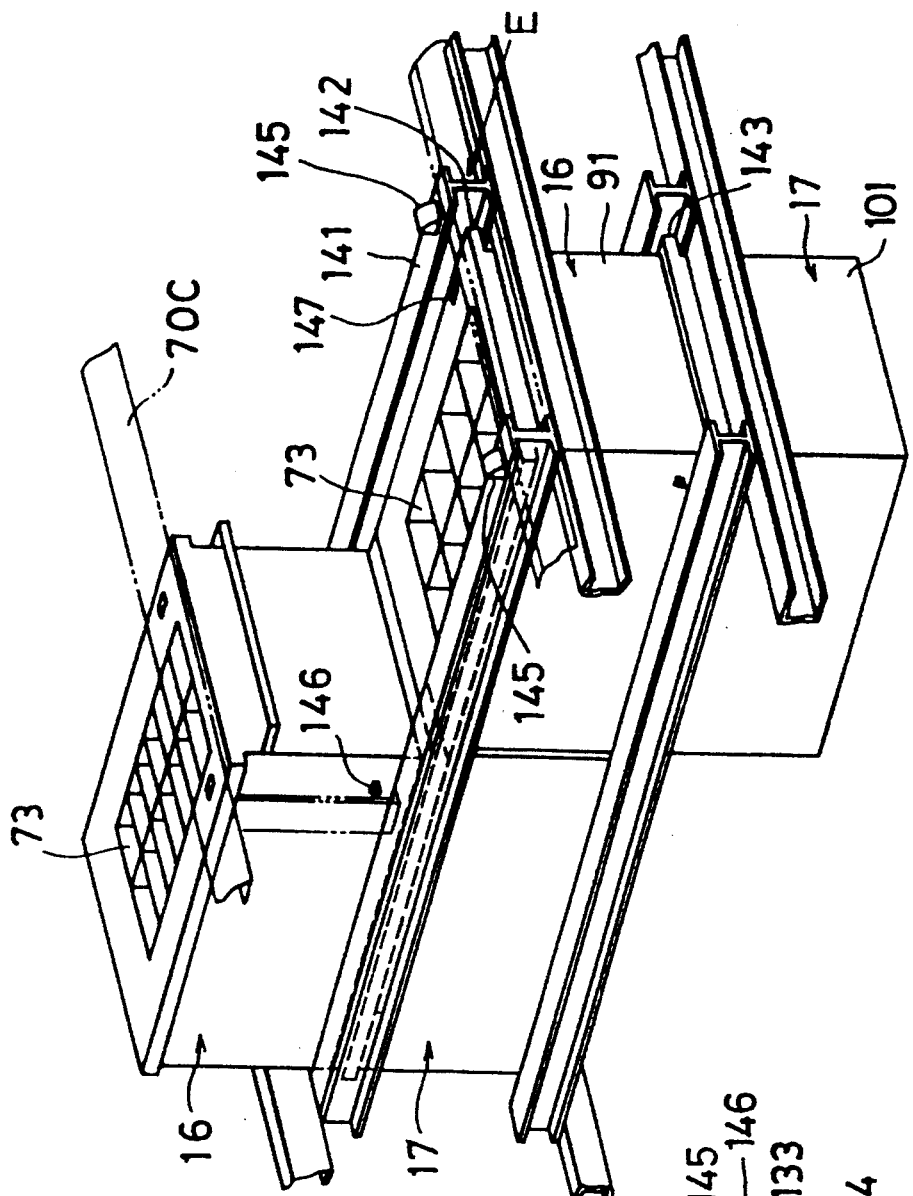
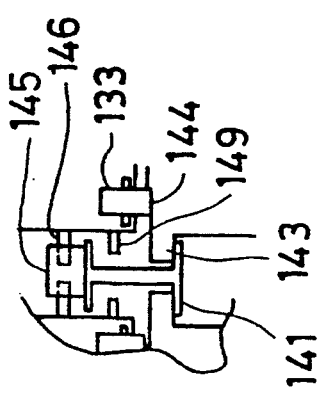
FIG.27(A)
FIG.27(B)

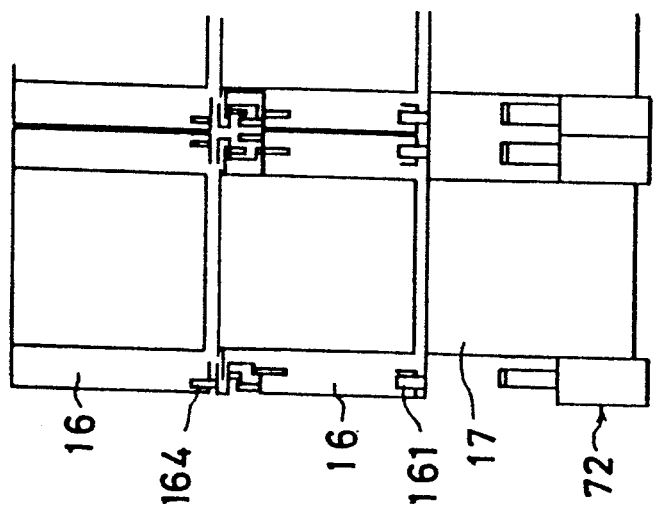
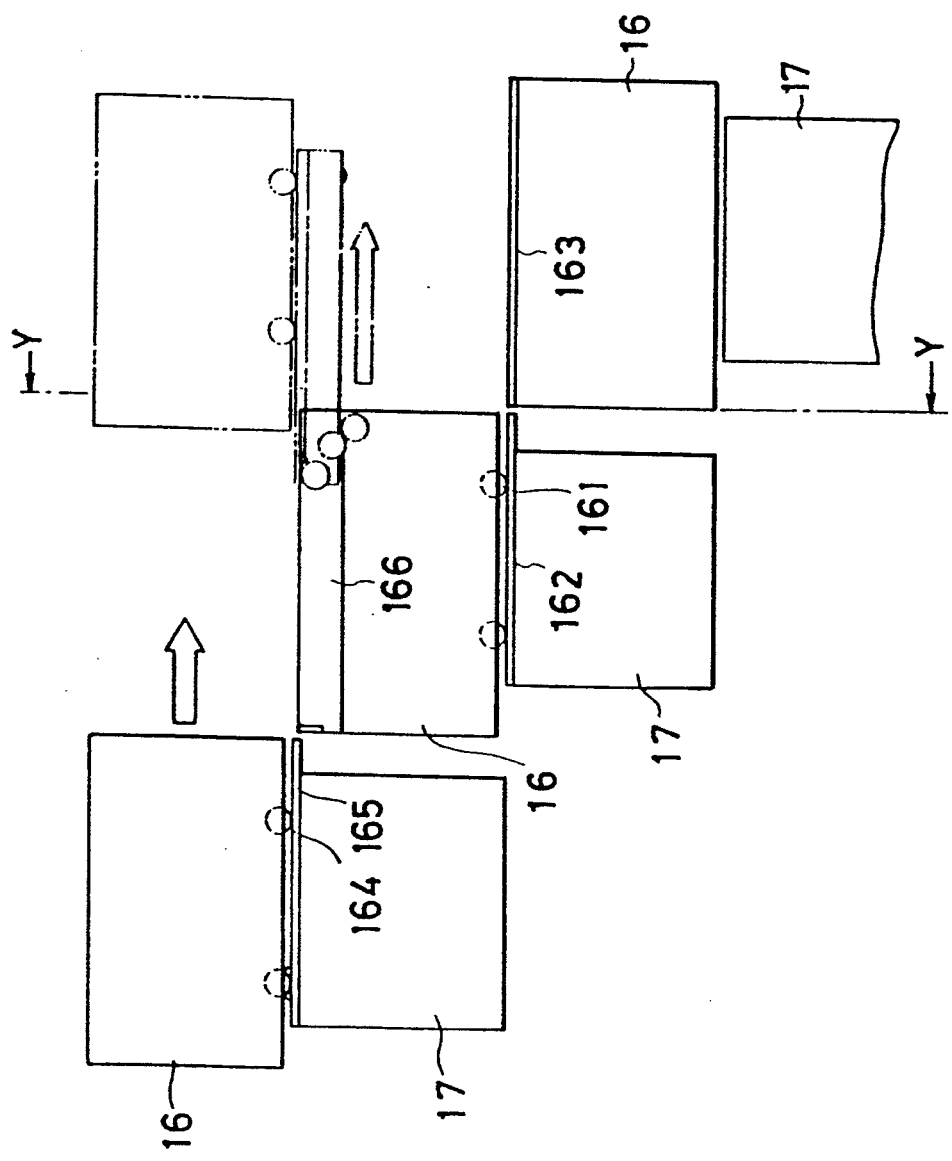
FIG.29(A)
FIG.29(B)

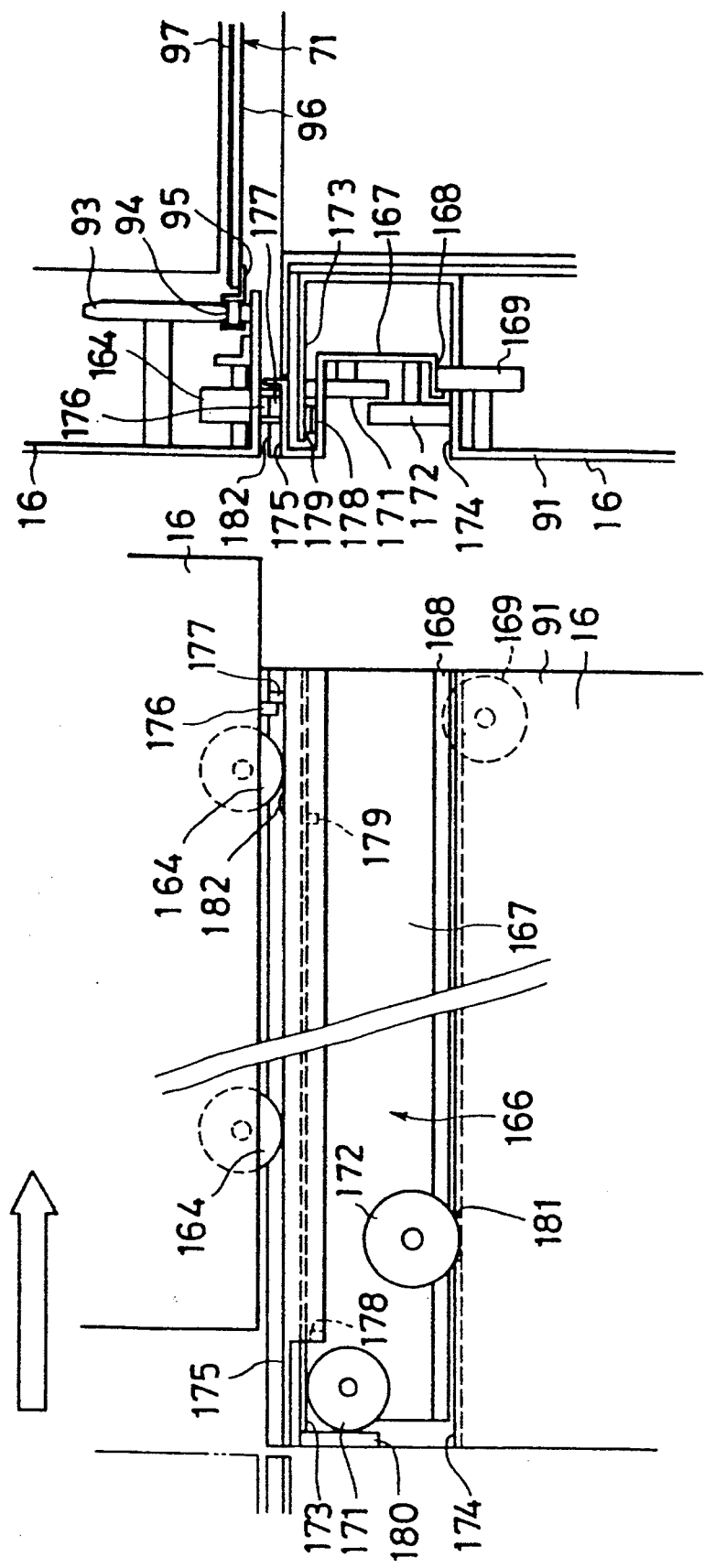

GOODS HANDLING APPARATUS AND METHOD

This application is a continuation of application Ser. No. 07/602,113, filed Oct. 23, 1990, now abandoned.

BACKGROUND OF THE INVENTION

1. Field of the Invention

This invention relates to a goods handling apparatus and method, for taking out goods from a container such as a corrugated fiberboard box, a plastic container etc., which contains therein a plurality of goods.

The present invention also relates to a goods handling apparatus and method in which goods stored in a storage apparatus are shifted over to a goods take-out device.

The present invention further relates to a goods handling apparatus for taking out goods stored in boxes which constitute a plurality of goods storage sections and particularly to a goods handling apparatus which is suitably used for picking goods in a distribution center.

2. The Prior Art (1) A prior art goods handling method and an apparatus is described in, for example, Japanese Patent Laid-open Publication No. Hei 1-192603.

In the Japanese Patent Laid-open Publication No. Hei 1-192603, there are described a goods handling method and apparatus in which all goods contained in a container which stores a plurality of goods are clamped and taken out of the container, and then a part of or all of the goods are released from the clamp, so that a desired number of goods can be picked up.

(2) A prior art system relating to storing boxes arranged in steps is described in, for example, Japanese Patent Laid-open Publication No. Sho 59-88110.

In Japanese Patent Laid-open Publication No. Sho 59-88110, there is described a wagon which also serves as a step. This prior art system comprises a step-like wagon with a lower part of its stepped surface serving as a drawer, and a storage box with its bottom surface formed in a step-like configuration coincident with the stepped surface of the step-like wagon, the design being such that when the storage box is placed on the step-like wagon, the wagon with the storage box forms a cube and is able to be stored under a top plate of a cooking table, etc.

(3) A prior art system relating to a goods handling apparatus, including a goods drop-out device, is described for example in Japanese Utility Model Laid-open Publication No. Sho 63-175622. The prior art described in this publication will now be described. The goods drop-out device described in this publication includes a feed plate on which goods are fed in an orderly arrangement of a plurality of rows, a drop-out port formed on the feed plate and serving to discharge the goods therethrough, a gate plate for opening and shutting the drop-out port, and an activating device for opening and shutting the gate plate, the drop-out port being controlled to be opened and shut to the extent corresponding to a required number of goods. According to this known apparatus, goods fed to the drop-out port in an orderly arrangement of a plurality of rows can be dropped out in a required number by opening the drop-out port to the extent corresponding to the required number of goods in accordance with drop-out instructions.

The prior art described in the Japanese Patent Laid-open Publication No. Hei 1-192603 has the following problems.

As a multihand system comprising a plurality of clamping heads arranged in such a manner as to correspond to the arrangement of a stored state of goods in order to clamp a plurality of goods contained in a container is required for the exclusive use of each goods, the cost becomes high.

Nevertheless, assuming that after the goods have been shifted to a goods storage device of the present invention using this multihand, those goods are to be taken out in a goods storage section unit, the goods which are still in the arrangement of the stored state in the container are directly shifted to the goods storage device. As a result, in case the arrangement is three rows or more, the construction of the device for taking out the goods in the goods storage section unit becomes very complicated. Also, in case a plurality of goods drop-out devices each having goods storage sections arranged in the same manner as the arrangement of the goods contained in the container are arranged side by side in a plurality of rows, the entire dimension of the overall goods drop-out devices cannot be limited to integral multiples of the dimension of each container. Instead, the entire overall dimension becomes integral multiples of a dimension obtained by adding the dimension of each container to the dimensions of the shutter and its actuator, and as a result, the system becomes extremely large and various inconveniences are encountered in layout.

It is therefore a first object of the present invention to provide a goods handling method and apparatus, in which by shifting a plurality of goods contained in a container to a goods storage device having a plurality of goods storage sections which are arranged in no more than two rows, or otherwise by providing a pivot shaft of the shutter in the vicinity of a lower end portion of a side surface of a goods drop-out device, the constructions of shutters for opening and shutting the goods storage sections and actuators for actuating the shutters can be simplified, and a plurality of goods storage devices and goods drop-out devices can be arranged side by side in rows, thus enabling a saving of installation space.

(2) The prior art described in Japanese Patent Laid-open Publication No. Sho 59-88110 had the following problems.

The step-like wagon constituting a wagon which also serves as a step is equipped merely with a drawer (a portion merely for storing goods) at a lower portion of the step surface. It does not disclose nor even suggest that goods stored in a storage apparatus are shifted to a goods take-out device which has been moved to the storage apparatus side, and that after goods, which have been taken out of the goods take-out device, are shifted to the goods drop-out device, goods are dropped out from the goods drop-out device.

A second object of the present invention is to provide a goods handling method and apparatus, in which by shifting goods stored in a storage apparatus to a goods take-out device which has been moved to the storage apparatus side, the shifting work of goods can be performed with ease.

(3) The prior art described in Japanese Utility Model Laid-open Publication No. Sho 63-175622 had the following problems.

In the above-mentioned publication, there is no description nor suggestion about such a construction wherein a plurality of goods storage sections are formed by partitions and the partitions are detachably engaged with a casing. Also, the goods drop-out device described in the above-mentioned publication is, in fact, capable of discharging goods, which are fed thereto in an orderly arranged plurality of rows, by a required number each time. However, as the drop-out port of a feed plate and a gate plate are formed in predetermined sizes in accordance with the sizes, the configurations, etc. of goods, the sizes, configurations, etc. of goods to be discharged are affected by the dimensions of the drop-out port of the feed plate and the gate plate. As a consequence, it is impossible to make it correspond to many kinds of goods having different configurations, etc. To make it correspond to many kinds of goods, it is required initially to prepare a plurality of feed plates each having a drop-out port corresponding to the size, configuration, etc. of each kind of goods and gate plates corresponding to the drop-out ports, so that every time the size of goods is changed, the feed plate and gate plate can be replaced with such initially prepared ones.

There was also such a problem as that it is impossible to drop out goods, which are fed in inverted states, by a required number, owing to the relation between the drop-out port of the feed plate and the gate plate.

A third object of the present invention is to provide a goods handling apparatus in which a goods storage section is formed in such a manner as to correspond to the sizes, configurations, etc. of goods, so that many kinds of goods can be effectively stored and reliably taken out.

SUMMARY OF THE INVENTION

According to a first aspect of the invention, the system is constructed such that goods arranged at random or in three rows or more in a container are shifted to a goods storage device having a plurality of goods storage sections which are arranged in no more than two rows.

According to another feature of the invention, after the goods, which have been shifted to the goods storage device, are shifted to the goods storage sections of a goods drop-out device, such shifted goods are dropped out or discharged in the above-mentioned goods storage section unit.

According to another feature of the invention, a goods drop-out device includes a plurality of goods storage sections containing goods and arranged in no more than two rows and shutters for opening and shutting the goods storage sections, a pivot shaft of each of said shutters is disposed at a lower end portion of a side wall of the goods drop-out device, and actuators for actuating the shutters are disposed on a side wall portion of the goods drop-out device.

According to the present invention as described above, goods, which are arranged at random, or in a predetermined number of rows and particularly in three rows or more in a container such as a corrugated fiberboard box and a plastic container, are stored in the goods storage device having a plurality of goods storage sections which are arranged in no more than two rows. After the goods have been shifted to the goods drop-out device having the plurality of goods storage sections which are arranged in no more than two rows, the shutters disposed along the side surface portion of the goods drop-out device are opened and shut by actuators and the goods which have been shifted to the goods storage sections of the goods drop-out device are discharged in goods storage section unit.

Therefore, by storing a plurality of goods contained in the container in a goods storage device having a plurality of goods storage sections which are arranged in no more than two rows, goods can be taken out by a desired number each time merely by storing those goods into the goods storage sections irrespective of the manner of arrangement of the goods in the container. Also, the shutters for opening and shutting the goods storage sections and actuators for actuating the shutters can be simplified in construction. As a result, a plurality of goods storage devices and goods drop-out devices can be arranged side by side in rows in a narrow space. Thus, the installation space can be saved.

According to the invention, a goods handling method is provided for moving goods stored in a storage apparatus to an upper location of a goods take-out position which is set in such a manner as to be opposite to the storage apparatus, the method comprising the steps of moving a goods take-out device, which is empty, from the goods take-out position toward the storage apparatus side, shifting goods to the goods take-out device located on the storage apparatus side, and then moving the goods take-out device, from which the goods have been shifted, to the upper location of the goods take-out position.

The invention further comprises the steps of taking out goods which have been shifted to the goods take-out device, shifting all goods, which have been taken out, to a goods drop-out device disposed to a lower location of the goods take-out position, and then discharging a desired number of goods from the goods drop-out device.

The invention is further featured in that a goods take-out position for taking out goods, which are stored in a goods take-out device, is set in steps, at least one said goods take-out device being able to move in a horizontal direction including the upper location of the goods take-out position.

The invention is still further featured in that the goods drop-out device is disposed at a lower location then the goods take-out position.

According to the invention as described above, by shifting goods stored in the storage apparatus toward the goods take-out device which has been moved to the storage apparatus side, the goods shifting work can be performed with ease.

According to yet another feature of the invention, a goods handling apparatus includes a casing with a plurality of goods storage sections formed by partitions, shutters for releasing opening portions of the goods storage sections in order to take out goods stored therein, said partitions being detachably engaged with the casing, a plurality of engaging portions adapted to engage with edges of the partitions being provided to the casing, the sizes of the goods storage sections being variable by inserting the partitions selecting the engaging portions.

According to the invention as described above, simply by reengaging the partitions with selected engaging portions in such a manner as to corresponding to the sizes, configurations, etc. of the goods, goods can be effectively stored and many kinds of goods can be reliably taken out.

BRIEF DESCRIPTION OF THE DRAWINGS

FIG. 1(A) is a plan view showing a picking system according to one embodiment of the present invention;

FIG. 10(A) is a sectional view taken on line X—X in FIG. 9;

FIG. 10(B) is an enlarged view of a circled portion indicated by A in FIG. 10(A)

FIGS. 24(A) and 24(B) are schematic views showing a pull-out reserve tank;

FIG. 27(A) is a perspective view showing a modified embodiment explaining the frame structure of the picking apparatus;

FIG. 27(B) is an enlarged view of a portion indicated by the arrow E in FIG. 27(A);

FIGS. 29(A) and 29(B) are schematic views showing a pulled-out state of the pull-out reserve tank of FIG. 28, wherein FIG. 29(A) is a plan view thereof; FIG. 29(B) is a sectional view taken on line Y—Y of FIG. 29(A);

FIGS. 30(A) and 30(B) are enlarged views of important parts of FIGS. 29(A) and 29(B);

DETAILED DESCRIPTION

A picking system 10, as shown in FIG. 1, comprises a case feed line 11, a case supplying device 12, a storage apparatus or gravity flow rack 13 (storage apparatus), a picking apparatus 14, and a container carrying line 15.

Figure 5:
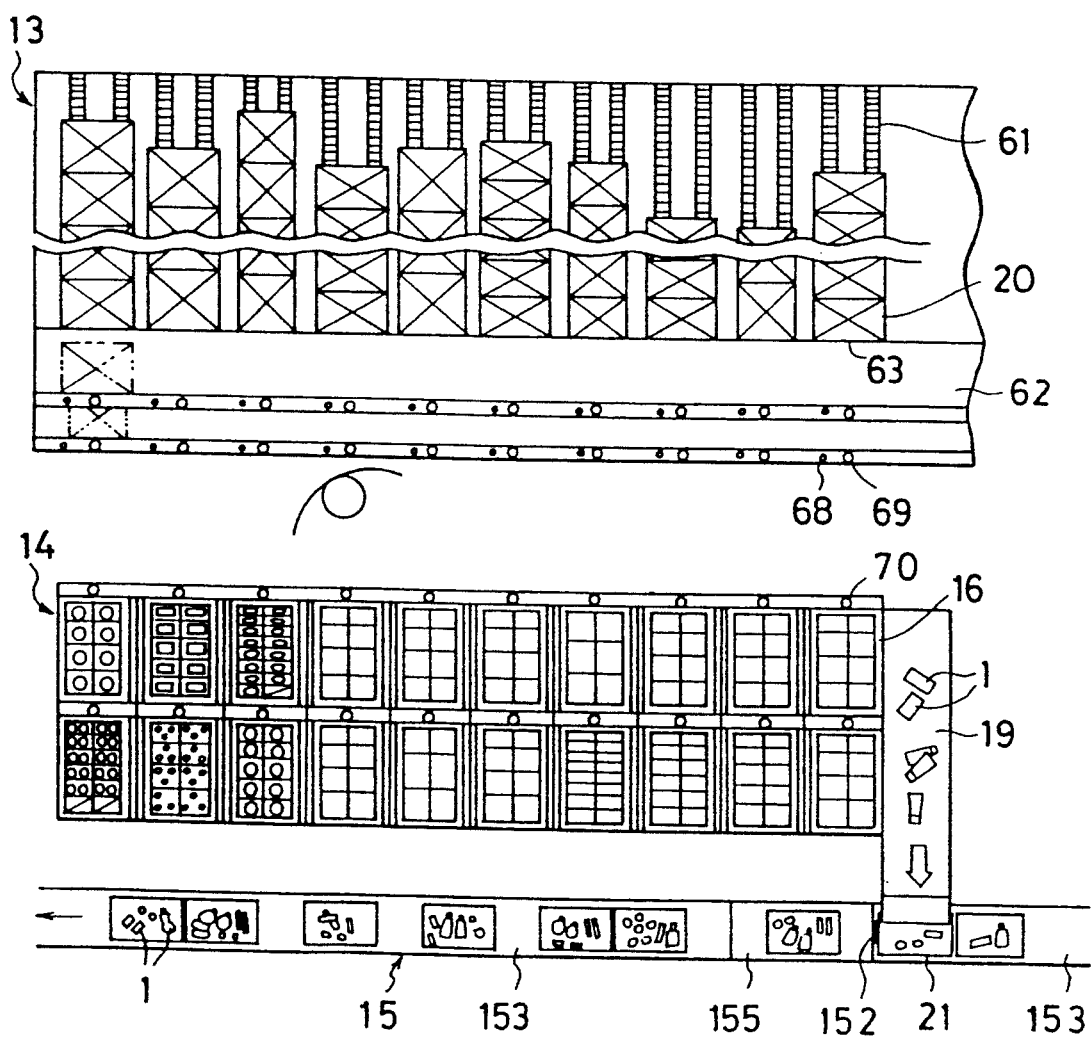
FIG. 5 is a plan view showing an important part of FIG. 1.
Figure 6:
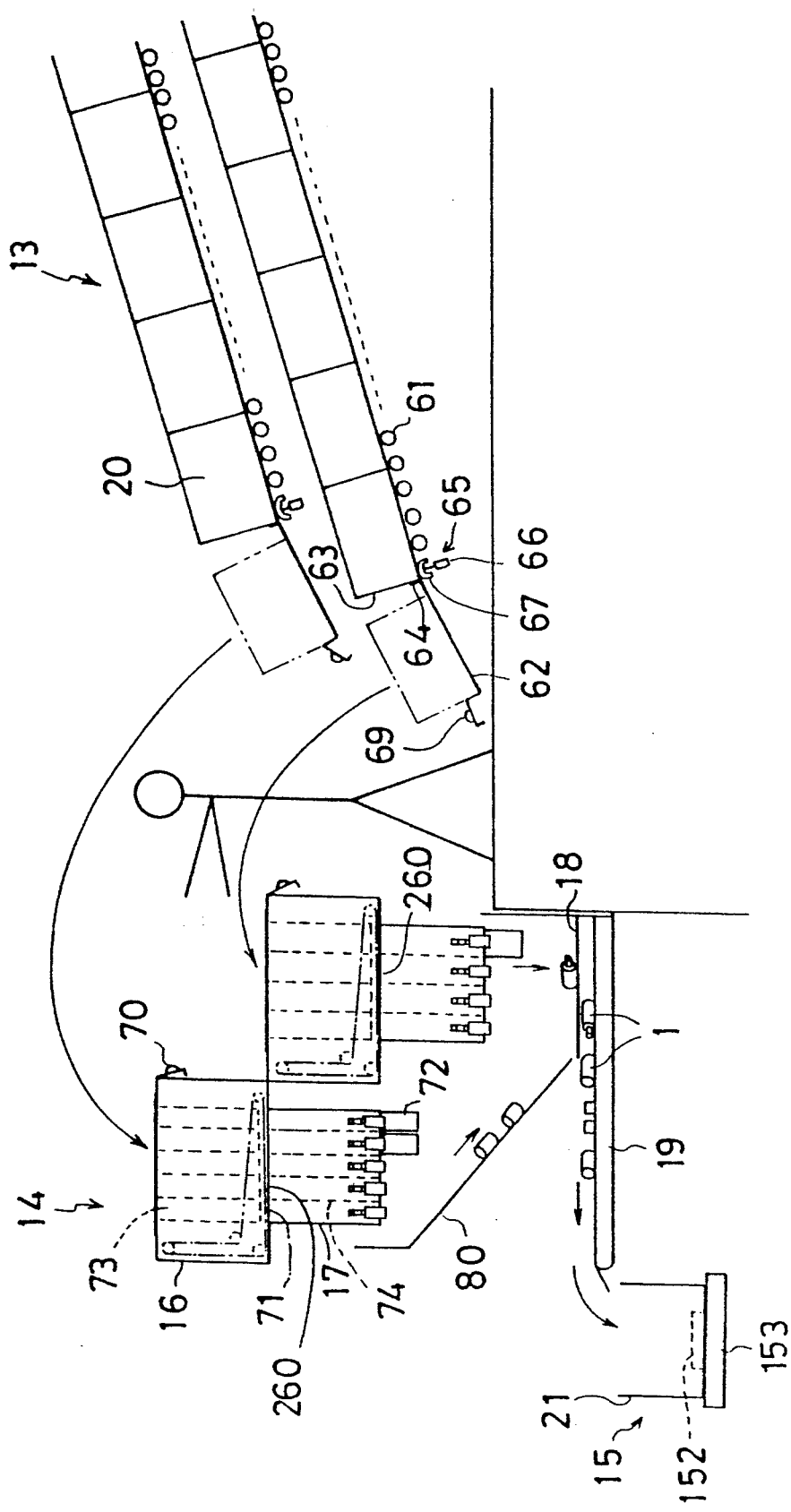
FIG. 6 is a side view of FIG. 5.
Figure 7:
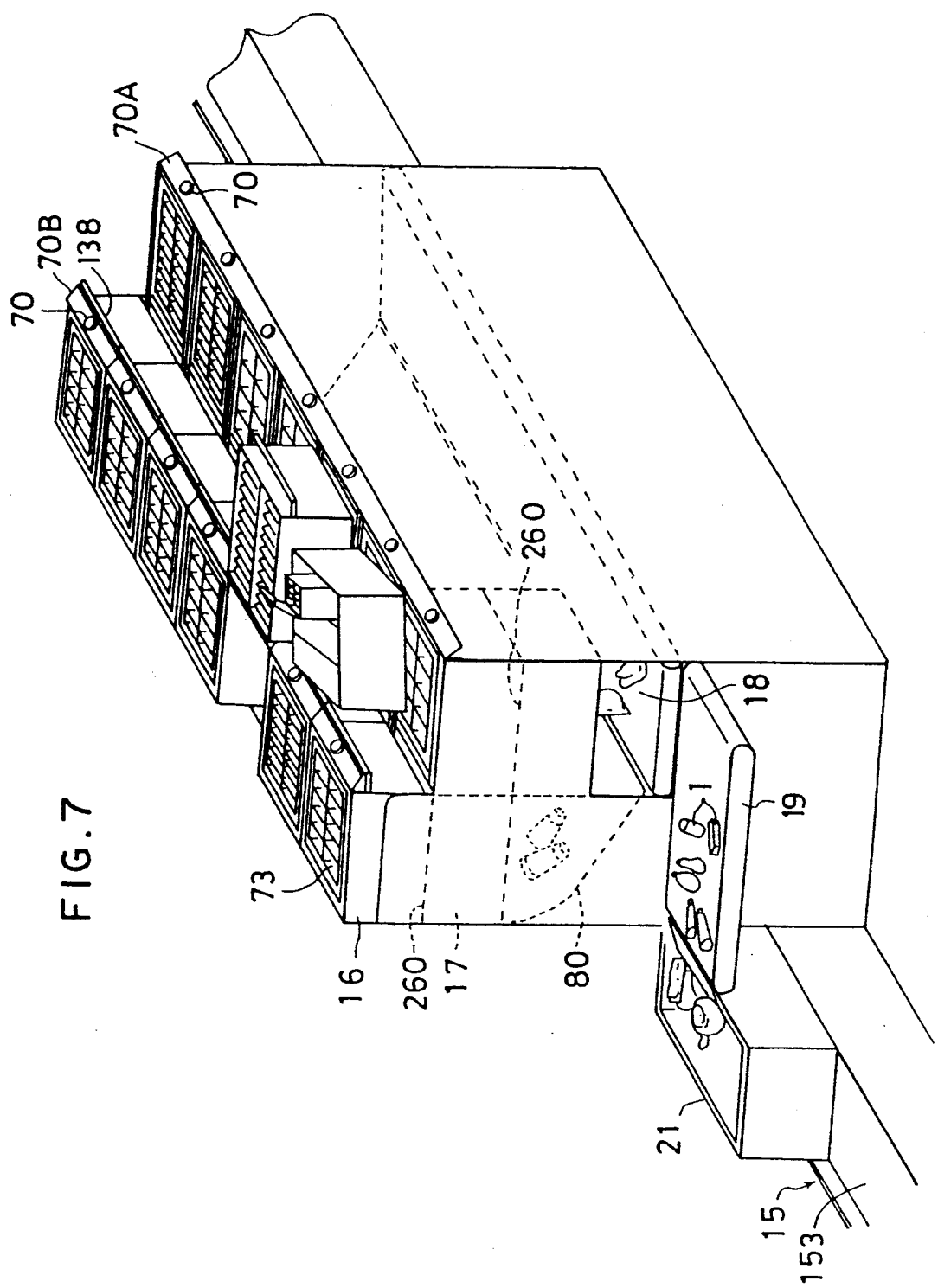
FIG. 7 is a perspective view showing a picking apparatus.
Figure 8:
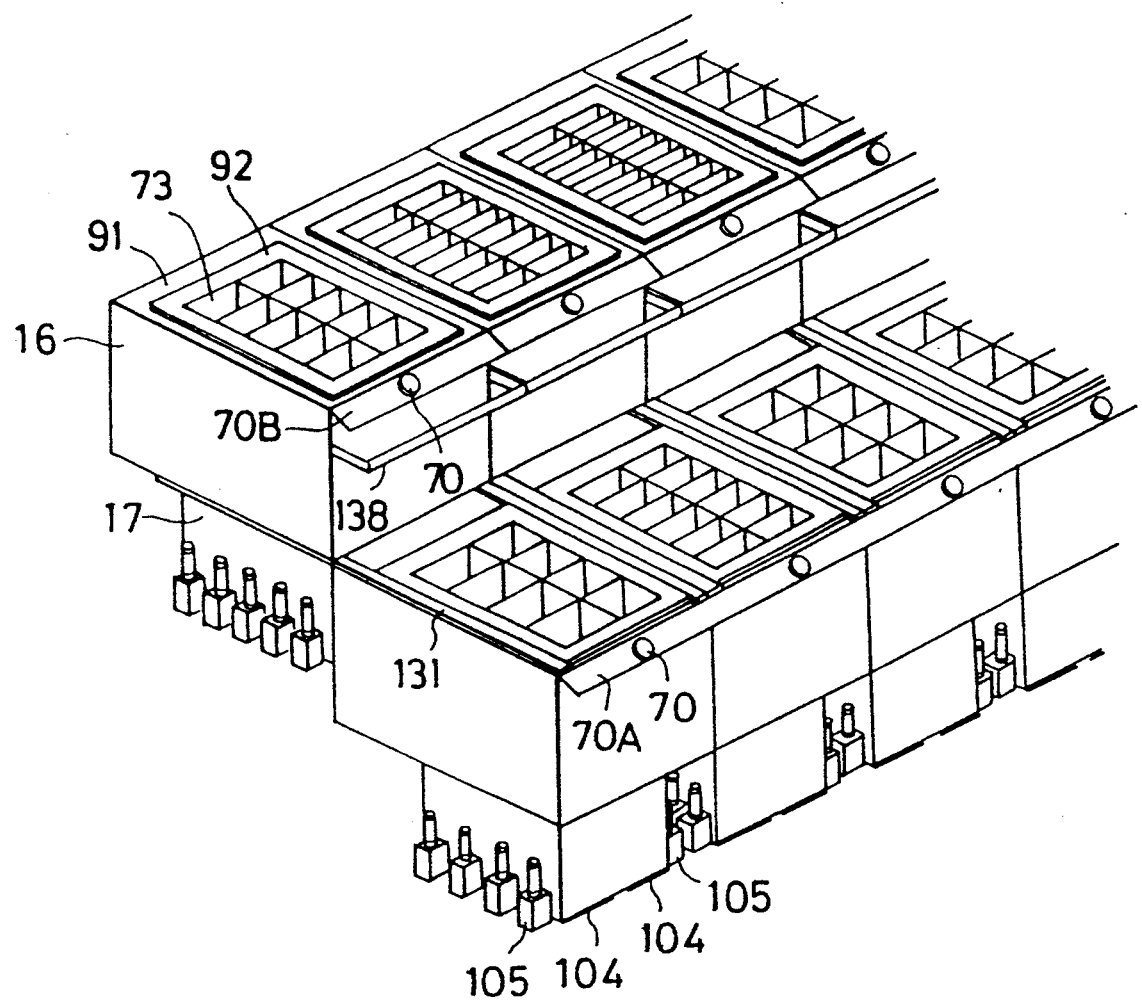
FIG. 8 is a perspective view showing a reserve tank of a picking apparatus and a drop-out device.

The picking apparatus 14, as shown in FIGS. 5 through 7, comprises a reserve tank 16 (goods storing device, goods take-out device, goods handling apparatus), a drop-out device 17 (goods drop-out device, goods handling apparatus), a collecting conveyor 18, and a shoot conveyor 19.

Figure 32:
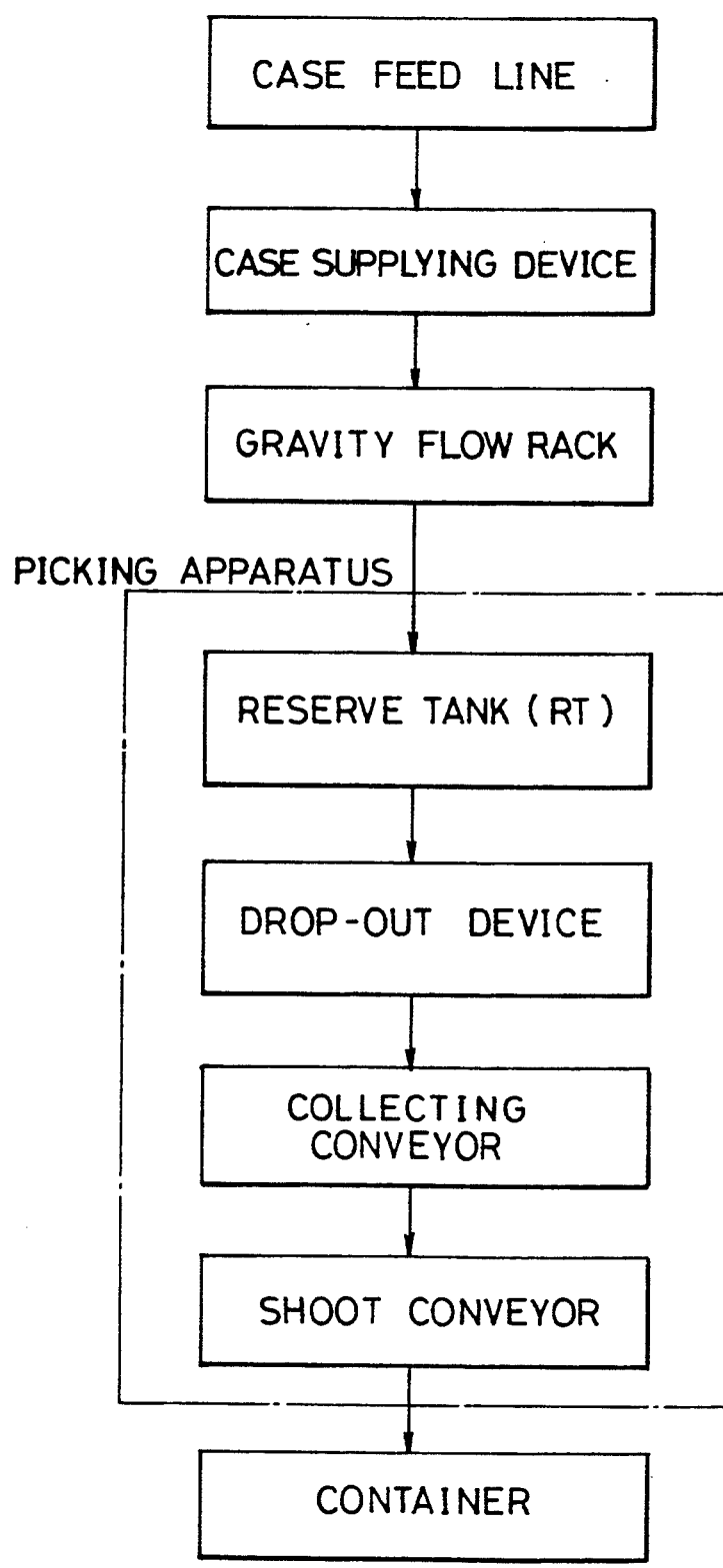
FIG. 32 is a flowchart showing the flow of goods in the picking system to which the present invention is applied.

That is, in the picking system 10, goods 1 flow in the sequence as shown in FIG. 32 using the above-mentioned various component parts, and then the goods 1 are picked up, and assorted and assembled as described below in the following sections ① through ⑥.

① In accordance with a requirement for supplying goods 1 to the gravity flow rack 13, a case 20 (container) containing the required goods 1 is fed to the case feed line 11.

② The case 20 fed to the case feed line 11 is then fed to a predetermined position of the gravity flow rack 13 by the case supplying device 12.

③ In accordance with a requirement for shifting the goods 1 to the reserve tank 16 of the picking apparatus 14, goods 1 are taken out of the case 20 containing the required goods 1 in the gravity flow rack 13 and all goods 1 contained in the case 20 are shifted to the reserve tank 16.

④ An instructed number of goods 1, which have been instructed to be picked up in such a manner as to correspond to a container waiting on the container carrying line 15 so as to be fed next (hereinafter simply referred to as the "feeding container"), are discharged to the collecting conveyor 18 from the drop-out device 17 and received thereon.

⑤ The goods received on the collecting conveyor 18 in the procedure ④ are collected or accumulated by the shoot conveyor 19.

⑥ When the feeding container 21 on the container carrying line 15 is brought to an outlet port (feeding port) of the shoot conveyor 19, the goods 1 collected on the shoot conveyor 19 are fed into the container 21.

In the picking system 10, the picking apparatus 14 is formed as one unit comprising, for example, 20 sets of reserve tanks 16 and drop-out devices 17 corresponding to 20 different kinds of goods 1 with respect to a single collecting conveyor 18 and shoot conveyor 19. The picking system 10 includes, for example, 5 units of first to fifth picking apparatuses 14 in total, which are arranged in series in the carrying direction of the container carrying line 15. Accordingly, when arriving at the first to fifth picking apparatuses 14, the container 21 carried by the container carrying line 15 is fed with goods 1 selected from the above-mentioned 20 different kinds of goods from each drop-out device 17 in the related picking apparatus 14 through the collecting conveyor 18 and shoot conveyor 19. Therefore, when the containers 21 have passed all of the first to fifth picking apparatuses, goods 1 selected from 100 different kinds of goods are fed therein and the picking operation is over. The gravity flow rack 13 is provided with 100 storing spaces arranged in a parallel relation so that a total of 100 different kinds of goods 1 can be supplied to a total of 100 reserve tanks 16.

Each of the various component elements of the picking system 10 will now be described in detail.

(A) Case Feed Line (see FIG. 1)

The case feed line 11 is comprised of a case feed conveyor 31.

For example, a total of 100 kinds of cases 20 containing each kind of goods 1 among a total of 100 kinds of goods 1 are carried out from storage facilities such as an automatic warehouse, where the above-mentioned total of 100 kinds of cases 20 are stored per pallet unit, and supplied to the gravity flow rack 13 in accordance with a supplying command or instructions. The goods are depalletized by a depalletizer, etc., and then, cases 20 containing desired goods 1 are carried onto the case feed conveyor 31 (FIG. 2) in, for example, a plane unit (one layer of goods stacked up in several layers on a pallet).

(B) Case Supplying Device (see FIGS. 1 through 4)

Figure 2:
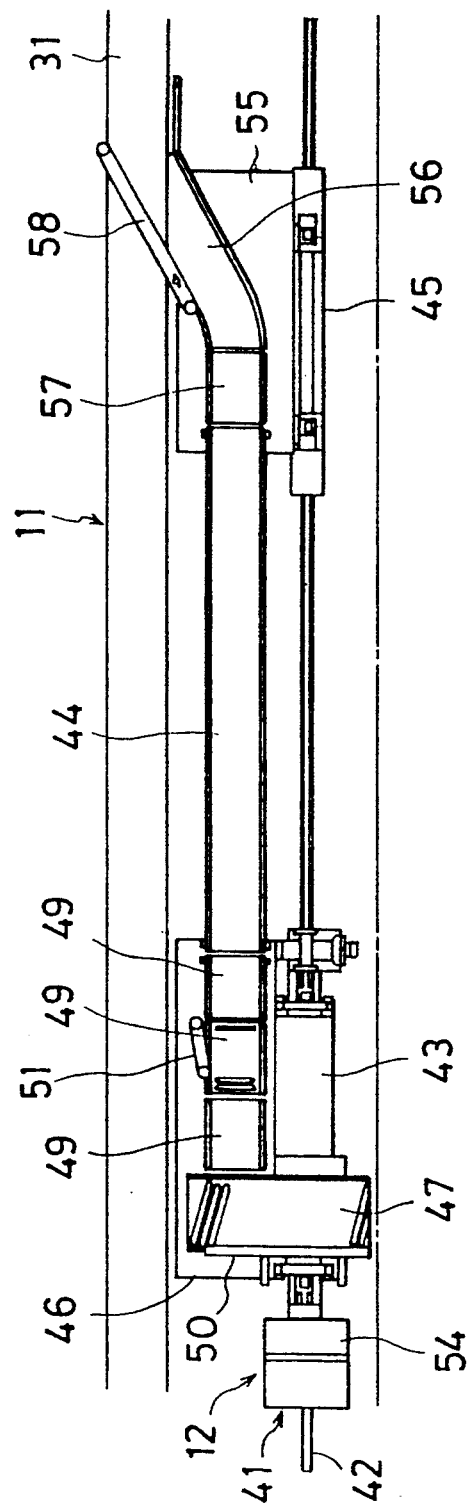
FIG. 2 is a plan view showing a case supplying device.
Figure 3:
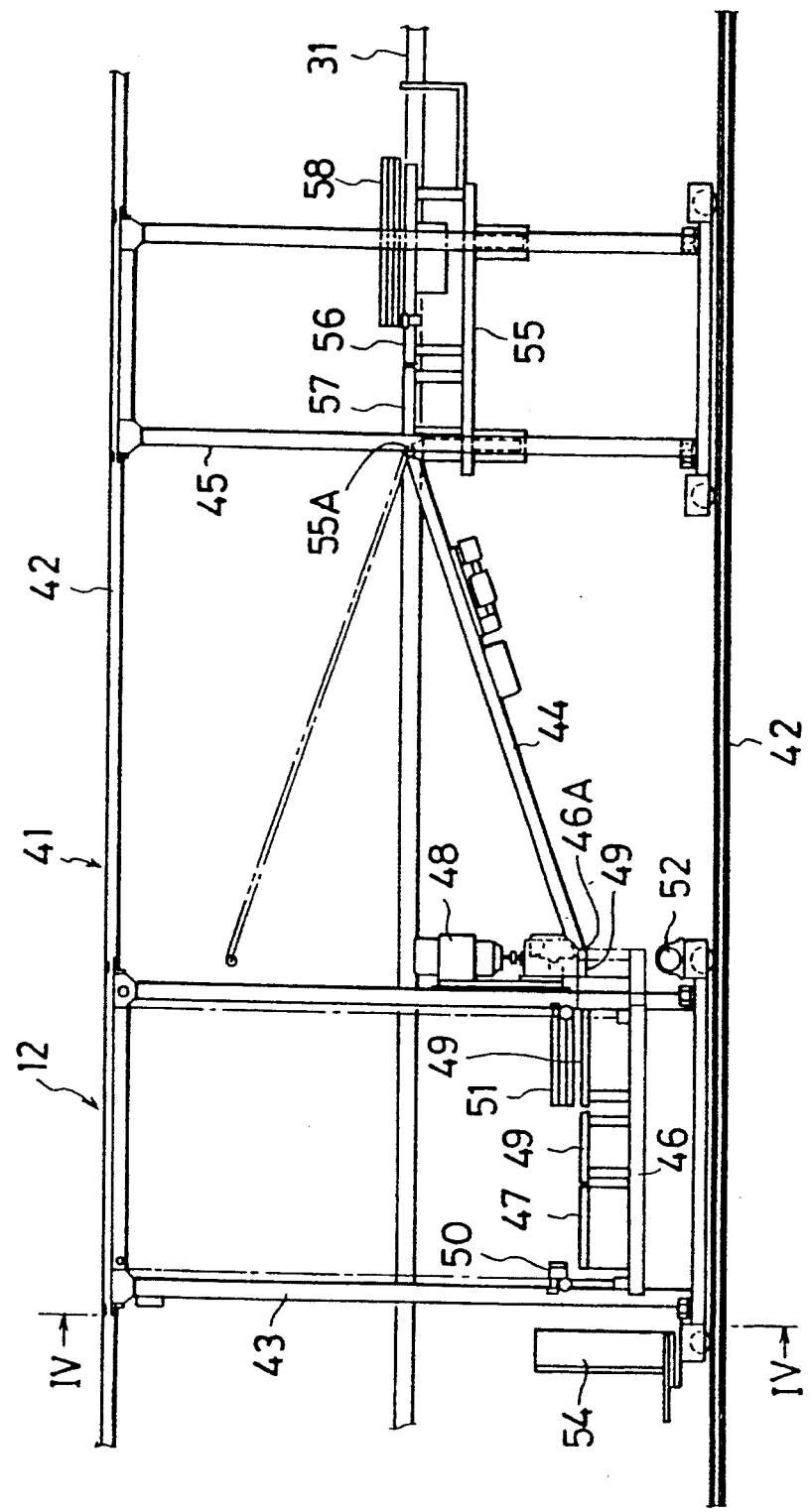
FIG. 3 is a front view of FIG. 2.
Figure 4:
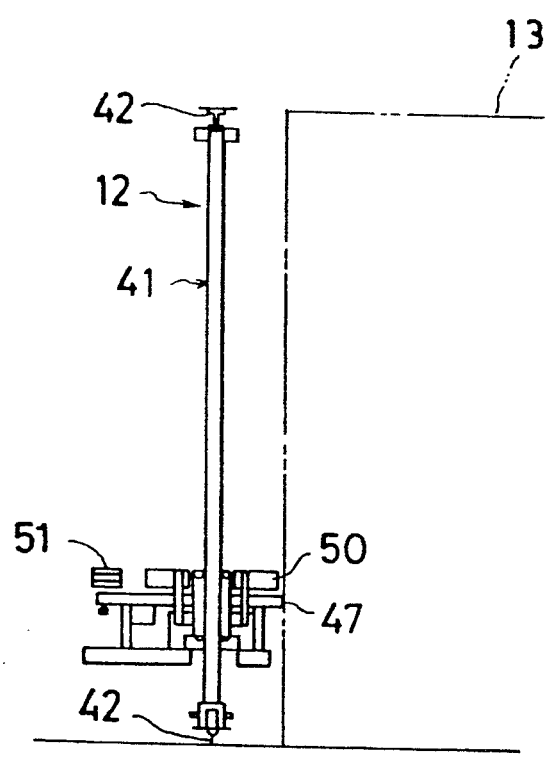
FIG. 4 is a view taken on line IV—IV in FIG. 3, as viewed from the direction as shown by the arrows.

The case supplying device 12 is comprises a stacker crane 41 (FIGS. 2-4).

The stacker crane 41 chiefly comprises a crane body 43 supported by upper and lower rails 42 and movable along storing spaces on the inlet side of the gravity flow rack 13, and a truck 45 for following the crane body 43 through a case transfer conveyor 44. Cases 20 on the case feed conveyor 31 are able to be fed to an optional storing space of the gravity flow rack 13 by means of the case transfer conveyor 44 and a case feed device 47 disposed on a lift portion 46 of the crane body 43.

The stacker crane 41 will be described in more detail. Besides the case feed device 47, three roller conveyor assemblies 49 adapted to transfer the cases 20 from the case transfer conveyor 44 to the case feed device 47 are arranged in series on the lift portion 46 which can be raised and lowered by a lift portion driving device 48 in the crane body 43. In this embodiment, a feeder comprising a roller conveyor equipped with a centering guide 50 is used as the case feed device 47. The rollers of the case feed device 47 are disposed at angles, as seen in FIG. 2. The centering guide 50 is designed such that cases to be fed to the gravity flow rack 13 are centered to a central portion of the roller conveyor of the case feed device 47 through a power cylinder (not shown) which is computer controlled in accordance with sizes thereof. The three roller conveyor assemblies 49 for transferring the cases 20 from the case transfer conveyor 44 to the case feed device 47 are disposed in such a manner as to be perpendicular to the case feed device 47, and the roller conveyor assembly 49 in the central portion is provided with a conveyor 51 adapted to guide the cases 20 which have been fed by the case transfer conveyor 44. In addition, the crane body 43 is provided with a travel driving device 52 for causing the crane body 43 to travel, a crane control device 54 for controlling the travel driving device 52, the lift portion driving device 48, etc., and others.

Also, a curved conveyor 56 and a conveyor 57 which are adapted to transfer the cases 20 from the case feed conveyor 31 to the case transfer conveyor 44 are arranged in this order on a loading portion 55 of the truck 45 in the stacker crane 41 in such a fashion as to be at the same height as the case feed conveyor 31. The front end portion of the conveyor 56 is placed proximate to the side edge of the upper surface of the case feed conveyor 31. Located on one side of the front end portion of the conveyor 56 is a guide conveyor 58 adapted to smoothly guide the cases 20 to the conveyor 56 and projecting on the case feed line 31.

Further, the case transfer conveyor 44 in the stacker crane 41 is pivotally supported at one end thereof on a fulcrum 46A of the lift portion 46 of the crane body 43, and is also pivotally supported at the other end on a fulcrum 55A of the loading portion 55 of the truck 45 in such a manner as to keep the same height with the case feed conveyor 31.

(C) Gravity Flow Rack (see FIGS. 1, 5 and 6).

The gravity flow rack 13 has multistage and multirow storing spaces (for example, two stages in the vertical direction and 50 rows in the horizontal direction) adapted to store cases (i.e., containers such as corrugated fiberboard boxes and plastic containers, which contain therein a plurality of goods 1 and usually have an open top, i.e., the top surface being cut away). Generally, each storing space is provided with a forwardly downwardly inclined roller-type free conveyor 61 (FIG. 6) so that the cases 20 stored therein can freely move forwardly and downwardly by the dead weight thereof, one end (front end) of the free conveyor 61 being provided with a case receiving table 62. The free conveyor 61 of each storing space comprises a pair of roller conveyors. The case receiving table 62 is continuously formed in the horizontal direction along the frontages of the multirow storing spaces. In this embodiment, such case receiving table 62 is disposed in multistage (two stages, for example) in the vertical direction in such a manner as to correspond to the storing spaces on each stage. Also, the gravity flow rack 13 has a case take-out plane formed at a front surface of the gravity flow rack 13. This take-out plane 63 is divided into five zones so that they correspond to a total of 5 units of first to fifth picking apparatuses mentioned previously. Each zone is set, in the example of this case, such that it takes out each case 20 containing 20 kinds of goods 1 which are stored in each one of the storing spaces of 10 rows×2 stages=20 pieces.

The goods 1 contained in the cases 20 which are stored in each storing space of the gravity flow rack 13 are to be shifted to the vertically and horizontally corresponding reserve tanks 16 of the picking apparatus 14. That is, each of the vertically and horizontally corresponding storing spaces of the gravity flow rack 13 and each reserve tank 16 of picking apparatus 14 are set to handle the same goods 1.

As one construction of the free conveyor 61, a wheel may be employed instead of the roller system shown in the drawings.

Each storing space of the gravity flow rack 13 is provided with a stopper 64 (FIG. 6) disposed between the free conveyor 61 and the case receiving table 62, and a case take-out device 65 adapted to take out the case 20 stopped by the stopper 64 toward the case receiving table 62 side. The case take-out device 65 takes out the case 20 one by one, by projecting the lift table 67, which is raised and lowered by an air cylinder 66, upward to a position exceeding the height of the stopper 64. The numeral 68 (FIG. 5) denotes a case take-out operation button adapted to actuate the air cylinder 66 (FIG. 6) and which is disposed at the front of each storing space in such a manner as to be side by side with a shifting goods indicator 69 (FIGS. 5 and 6) which will be described later.

Also, a shifting goods indicator 69 is disposed in an easy to see position in front of each storing space of the gravity flow rack 13. That is, in the picking system 10, when there arises a necessity for shifting the goods 1 contained in the case 20 in the gravity flow rack 13 to a certain reserve tank 16 of the picking apparatus 14, (a) a shifting requirement indicator 70, which will be described afterwards, disposed at the front surface of each reserve tank 16 is actuated to blink, and (b) the shifting goods indicator 69 disposed at a storing space corresponding to the reserve tank 16, i.e., the storing space of the gravity flow rack 13 in which the case 20 containing the goods 1 to be shifted to the reserve tank 16 are stored is actuated to blink, thereby to inform or alert a worker to the fact that a shifting of goods is required.

When a plurality of requirements for shifting goods 1 to the reserve tanks 16 should occurr at the same time, ①  in case the width of one unit of the picking apparatus 14 is small, the shifting goods indicators 69 and the shifting requirement indicators 70 blink one set at a time, and ② if the width of one unit of the picking apparatus 14 is large and two workers or more are stationed for every unit, plural sets of the shifting goods indicators 69 and the shifting requirement indicators 70 are simultaneously blinked. The shifting goods indicators 69 and the shifting requirement indicators 70 may be comprised of an illumination type push-button which can be turned off by the worker after he has completed the shifting work, respectively.

(D) Picking Apparatus (see FIGS. 1, and 5 through 27)

The picking apparatus 14, as described previously, is constituted as one unit which includes plural sets (for example, 20 sets) of reserve tanks 16 and drop-out devices 17 corresponding to each of the different kinds of goods (for example, 20 kinds) with respect to a single collecting conveyor 18 and a shoot conveyor 19, and thus the handling of the apparatus is simplified (see FIGS. 5 through 8).

On the other hand, the picking apparatus 14 is designed such that a goods take-out position 260 for taking out goods 1 stored in each reserve tank 16 is set in two steps in a position opposite to the gravity flow rack 13, the reserve tank 16 being disposed above each goods take-out position 260, the reserve tank 16 on the inner side being able to move to a position above the goods take-out position 260 forwardly, i.e., toward the gravity flow rack 13 side. That is, in the picking system 10, the worker, when the goods 1 contained in the cases 20 stored in each storing space of the gravity flow rack 13 are to be shifted to the reserve tank 16 of the opposite picking apparatus 14 as mentioned above, pulls out the empty reserve tank 1 from the goods take-out position 260 toward the gravity flow rack 13 side. After the goods 1 have been shifted into the empty reserve tank 16 now located on the side of the gravity flow rack 13, the worker pushes the reserve tank 16, into which the goods 1 have been shifted, back to the goods take-out position 260.

The picking apparatus 14, as mentioned above, is provided with a shifting requirement indicator 70 at the front surface of each reserve tank 16. When the reserve tank 16 becomes empty, the shifting requirement indicator 70 informs this fact to the worker by blinking. At this time, the shifting goods indicator 69 provided for each corresponding storing space of the gravity flow rack 13 is also blinked as mentioned above. As the reserve tanks 16 on this side are not moved, the respective indicators 70 are mounted to an indicator mounting member 70A as a common continuous member for all reserve tanks 16 which are sidewardly adjacent to each other. On the other hand, the indicators 70 of the reserve tanks 16 on the inner side are mounted to independent indicator mounting members 70B for each reserve tank 16.

The picking apparatus 14 comprises a drop-out device (FIG. 6) disposed under the goods take-out position 260 where the reserve tank 16 is set. That is, in the picking system 10, the picking apparatus 14 comprises a serve tank 16, and a drop-out device 17 which are arranged in a vertically superposed relation, so that all goods 1 which have been shifted to the reserve tank 16 are shifted to the drop-out device 17 disposed thereunder by opening the integral shutter device (opening and closing device) 71 of the reserve tank 16 and therafter, a desired number of goods 1 can be dropped out toward the collecting conveyor 18 side from the drop-out device 17.

At this time, in the picking apparatus 14, a plurality of storage boxes (goods storage sections) 73 and 74 arranged in two rows and n lines are provided to the reserve tank 16 and the drop-out device 17, respectively. The goods 1 which are stored at random or in a predetermined arrangement in each case 20 stored in each storing space of the gravity flow rack 13 are manually shifted to each storage box 73 of the reserve tank 16 by a worker. The goods 1 which have been shifted to the reserve tank 16 are shifted to each storage box 74 of the drop-out device 17 by opening of shutter device 71. That is, the goods 1 which have been shifted to the reserve tank 16 are in turn shifted to each storage box 74 of the drop-out device 17 by controlling the opening of the integral shutter device 71. The integral shutter device 71 and the shutter device 72 are controlled with a picking control device (not shown) which includes the picking device 14.

The picking apparatus 14, in order to assort and assemble the goods 1 which are being dropped out from the plurality of drop-out devices 17 (for example, 20 devices) constituting one unit as mentioned above, and to feed the same to the container 21 on the container carrying line 15, includes an assorting and assembling device as will be described hereinafter.

The assorting and assembling device includes a chute 80 disposed under all of the drop-out devices 17 of the picking devices 14 constituting one unit along the whole drop-out devices 17, the collecting conveyor 18 disposed on the downstream side of the chute 80 along the drop-out devices 17, and the shoot conveyor 19 disposed on the downstream side of the collecting conveyor 18 and adapted to collect the goods 1 which have been dropped out to the collecting conveyor 18 from each drop-out device 17. In the assorting and assembling device, the carry-out transfer speed of the collecting conveyor and the collecting transfer speed of the shoot conveyor 19 are arranged to be generally proportional to the long carry-out transfer distance of the collecting conveyor 18 and the short collecting transfer distance of the shoot conveyor 19. Owing to the foregoing arrangement, the goods 1 which have been dropped out from each drop-out device 17 along the longitudinal direction of the collecting conveyor 18 and scattered on the collecting conveyor 18, are transferred from a long and high speed collecting conveyor 18 to the short and low speed shoot conveyor 19 due to a difference in transfer speed between the collecting conveyor 18 and the shoot conveyor 19. As a result, those goods 1 are densely collected on the shoot conveyor 19 without damage.

The shoot conveyor 19 includes a transfer speed changing device (not shown). The transfer speed changing device is controlled by a picking control device to change the carry-out transfer speed (speed for discharging the goods 1 to the container 21 on the container carrying line 15) of the shoot conveyor 19 so that it becomes faster than the collecting transfer speed (speed when the shoot conveyer 19 receives the goods 1 carry out from the collecting conveyer 18) of the shoot conveyor 19. By this means, the goods 1 are immediately densely collected at the early part of the receipt of the goods 1 by the shoot conveyor 19 and the assorting and assembling work is over. In the next step, the group of goods 1, the assorting and assembling work for which have been over, are fed to the container 21.

The reserve tank 16 and the drop-out device 17 will be described in more detail.

Figure 9:
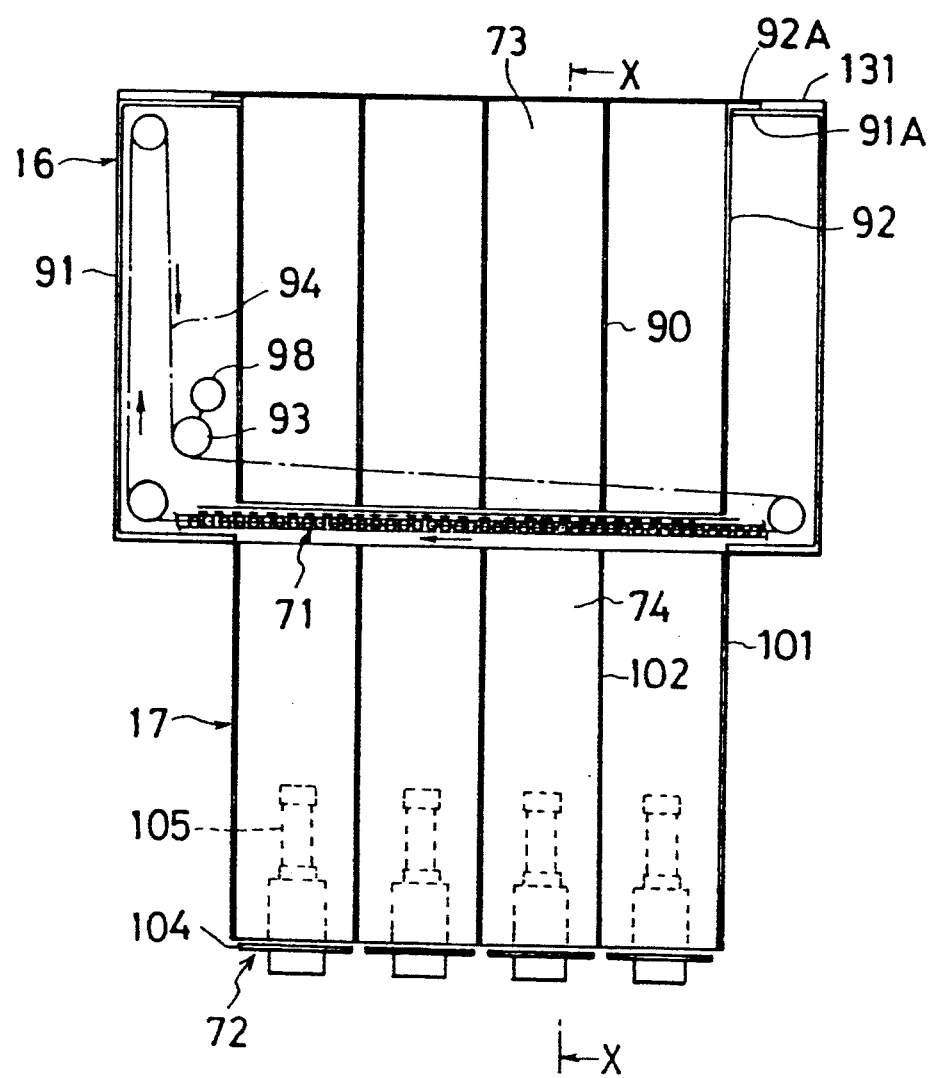
FIG. 9 is a sectional view showing a reserve tank and a drop-out device of a picking apparatus.
Figure 11:
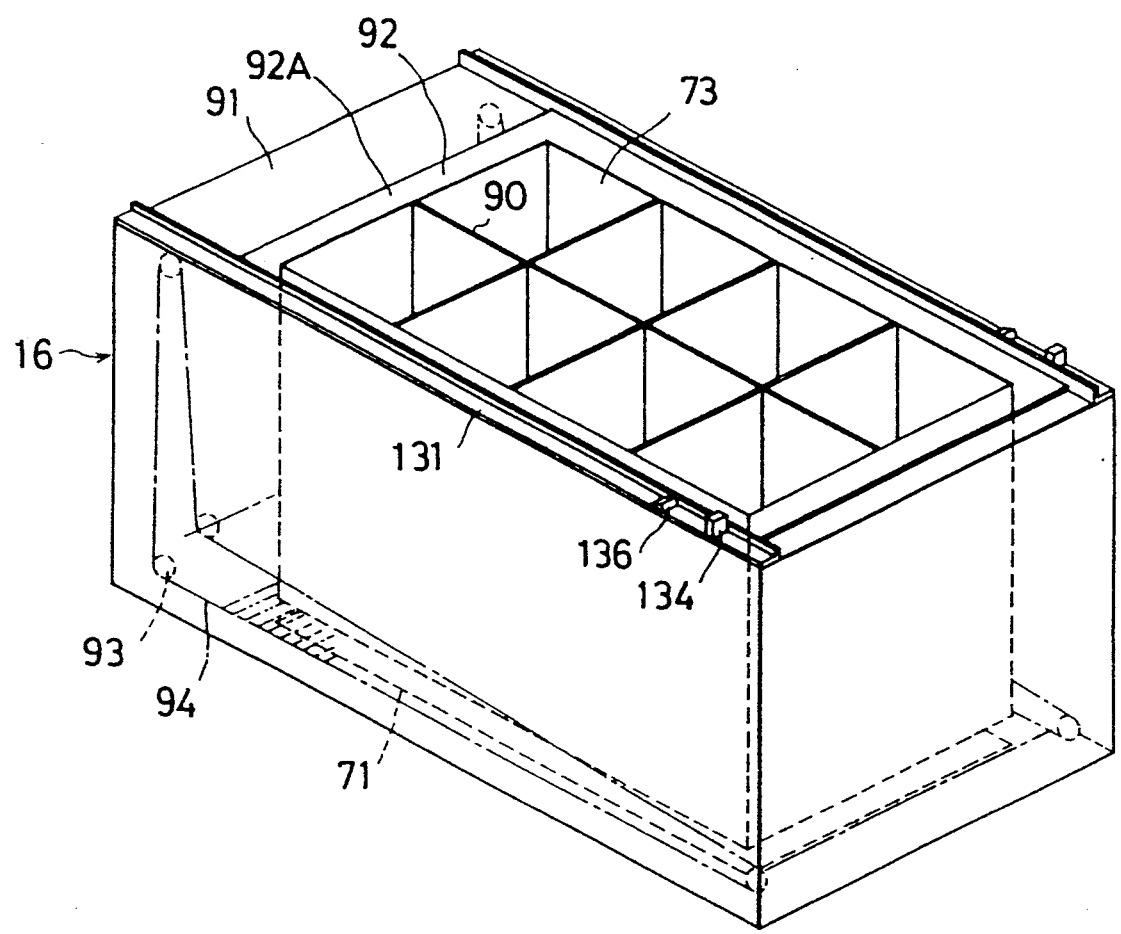
FIG. 11 is a perspective view showing a reserve tank on the outer side.
Figure 12:
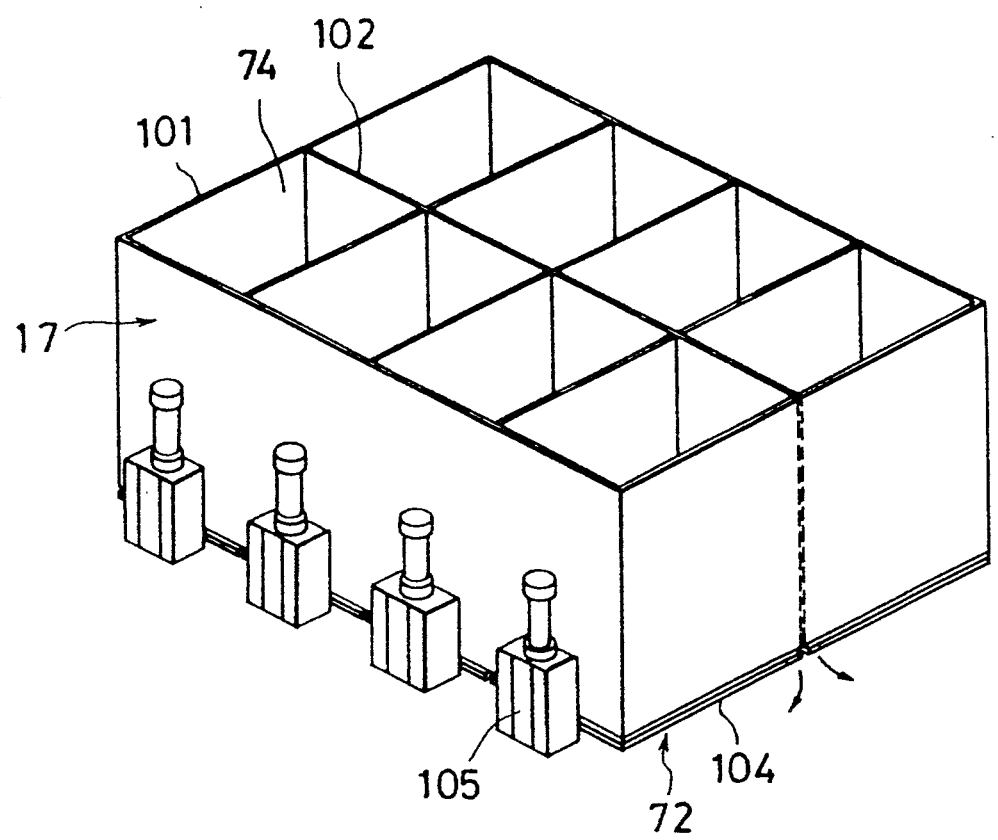
FIG. 12 is a perspective view showing a drop-out device on the outer side.
Figure 13:
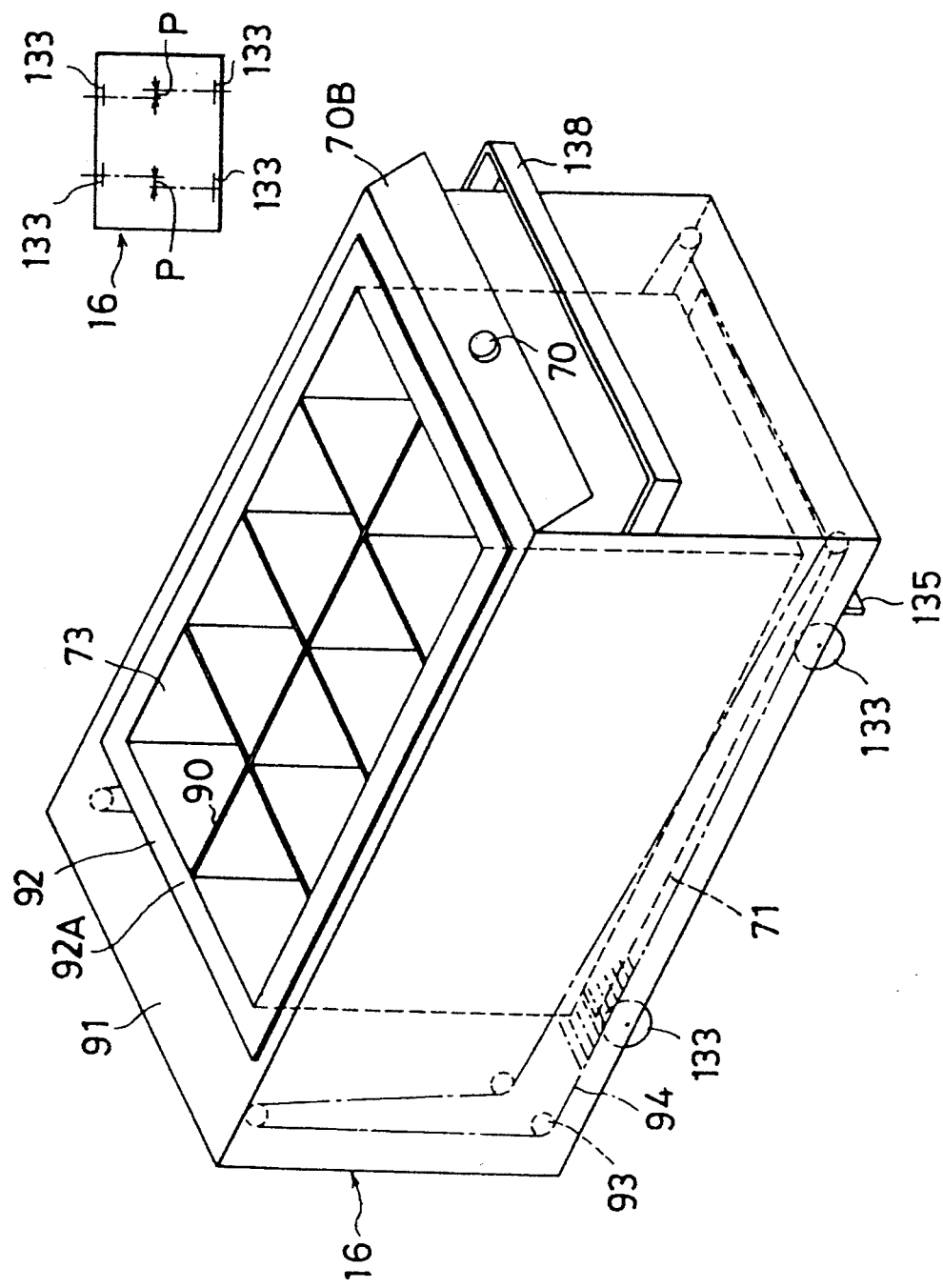
FIG. 13(A) is a perspective view of a reserve tank on the inner side.
FIG. 13(B) is a schematic view showing the arrangement of free rollers of FIG. 13(A)
Figure 14:
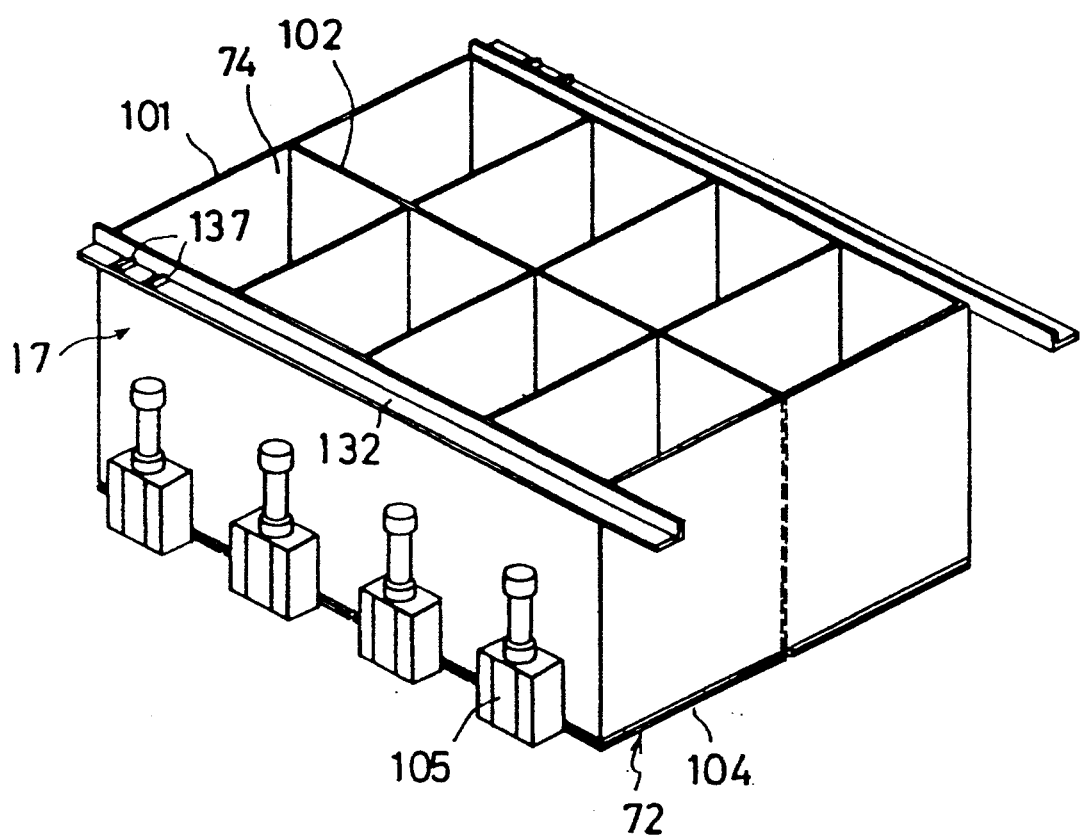
FIG. 14 is a perspective view showing a drop-out device on the inner side.
Figure 15A:
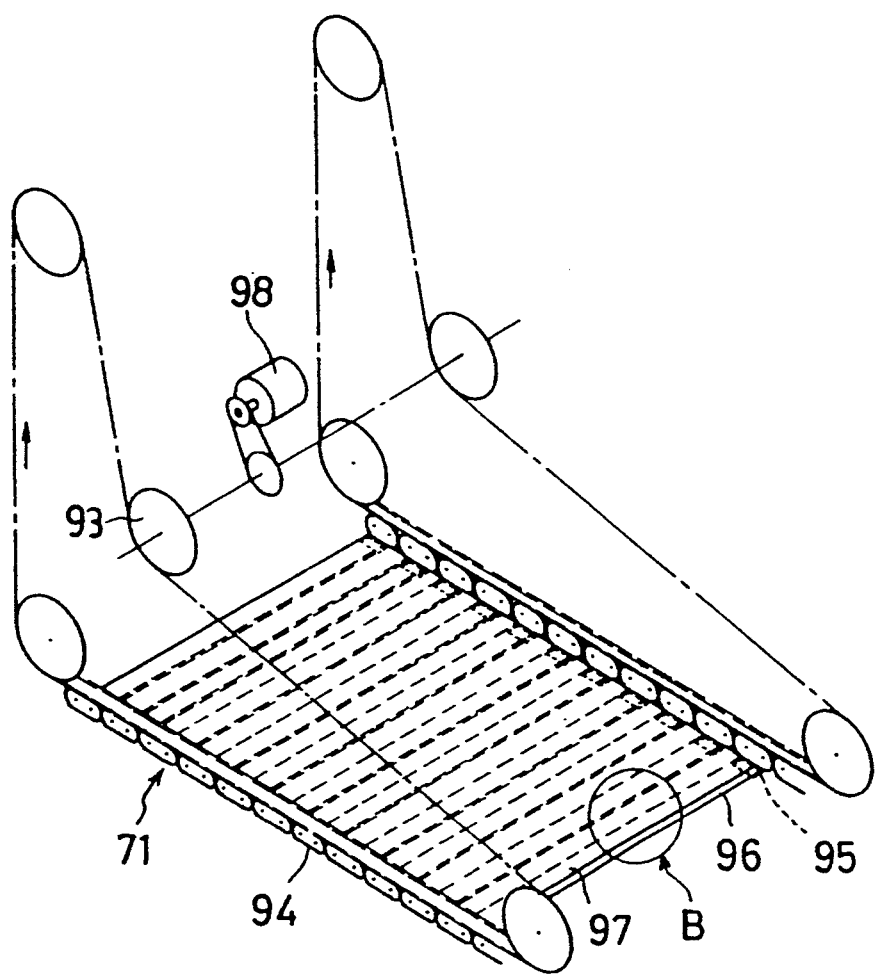
FIG. 15(A) is a perspective view showing an integral shutter used in the reserve tank.
Figure 15B:
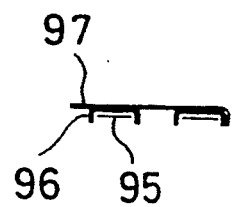
FIG. 15(B) is an enlarged view of the circled portion indicated by B in FIG. 15(A)

The reserve tank 16, as shown in FIGS. 9 and 10, is constructed such that a storage box assembly 92 can be engaged with and disengaged from a reserve tank body 91. A peripheral flange portion 92A (FIG. 10(A)) of the storage box assembly 92 is carried on an opening support edge 91A of the reserve tank body 91. The storage box assembly 92, as described above, forms a plurality of storage boxes 73 arranged in two rows and n lines with length and breadth partitions 90 and a predetermined single or plurality of goods 1 can be stored therein.

Also, the reserve tank 16 is provided at a bottom portion of the reserve tank body 91 with the afore-mentioned integral shutter device 71. The integral shutter device 71, as shown in FIGS. 9, 10(A), 10(B), 15(A) and 15(B), is designed such that a chain 94 is looped around four wheels 93 which are disposed on the inner wall on both sides on the reserve tank body 91, an attachment 95 being mounted to a part of the right and left chain 94 in the longitudinal direction, the part within the range equal to the bottom portion of the reserve tank body 91. A slat 96 is bridged between the opposite right and left attachments 95. The integral shutter 97 formed of a continuous thin, easy to slip sheet is attached to an upper surface of the entire slat 96. The integral shutter device 71 rotates the wheel 93 and the chain 94 normally (forward direction) and in a reverse direction through a rooter 98 controlled by a picking control device, and opens and shuts the bottom opening of the reserve tank body 91 through the integral shutter 97. Owing to the foregoing arrangement, in the reserve tank 16, the goods 1 are stored and maintained in the above-mentioned storage boxes 73 by making the integral shutter device 71 be in its shut state. The goods 1 can be shifted, all at the same time, to each of the storage boxes 74 of the drop-out device 17 thereunder by making the integral shutter device 71 be in its shut state, as mentioned above.

Figure 16A:
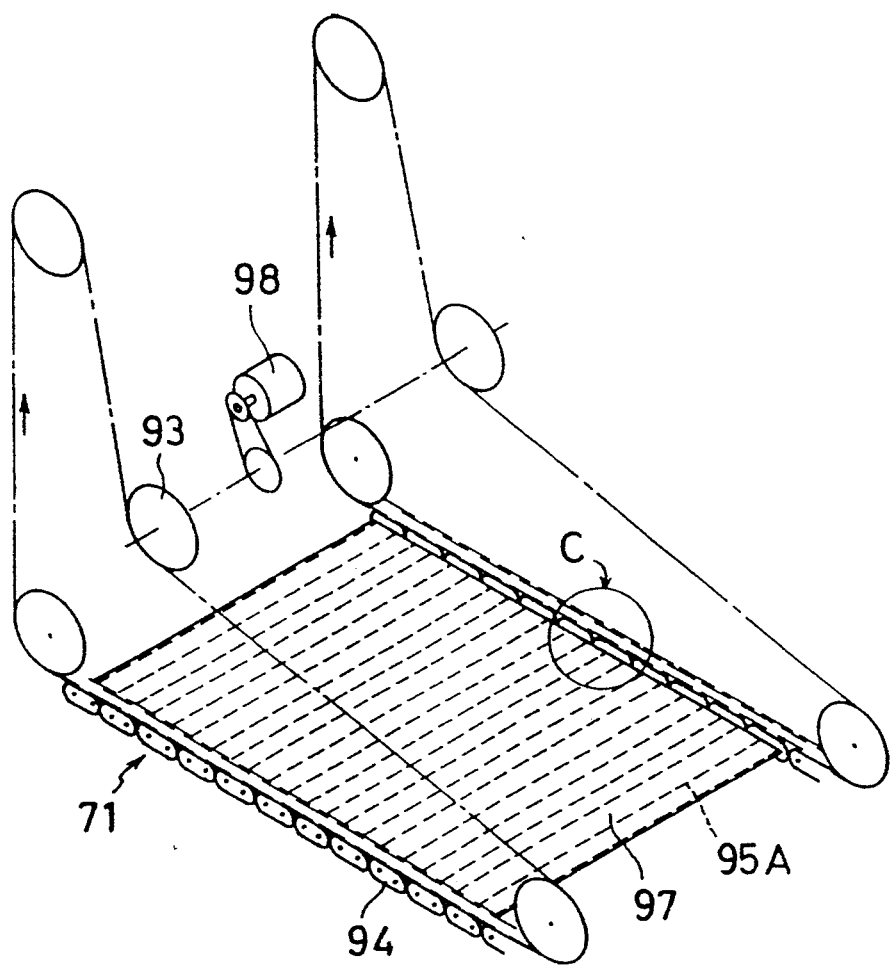
FIG. 16(A) is a perspective view of a modified embodiment of the integral shutter.
Figure 16B:
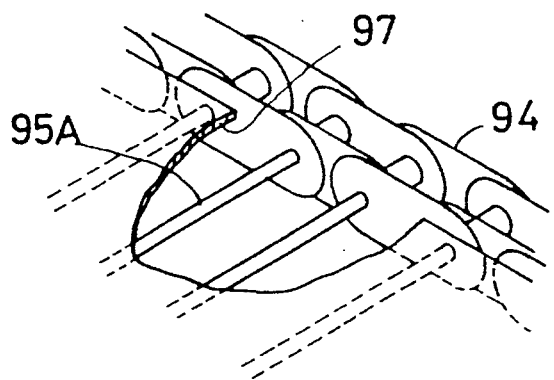
FIG. 16(B) is an enlarged view of the circled portion indicated by C in FIG. 16(A)

The integral shutter device 71, as shown in FIGS. 16(A) and 16(B), is designed such that a support shaft 95A, which is bridged between the opposite right and left chains 94, is coupled to a part of the chain 94 in the longitudinal direction, the part within the range equal to the bottom portion of the reserve tank body 91. The integral shutter 97, formed of a continuous thin, easy to slip sheet, is attached to an upper surface of the entire support shaft 95A.

Figure 23:
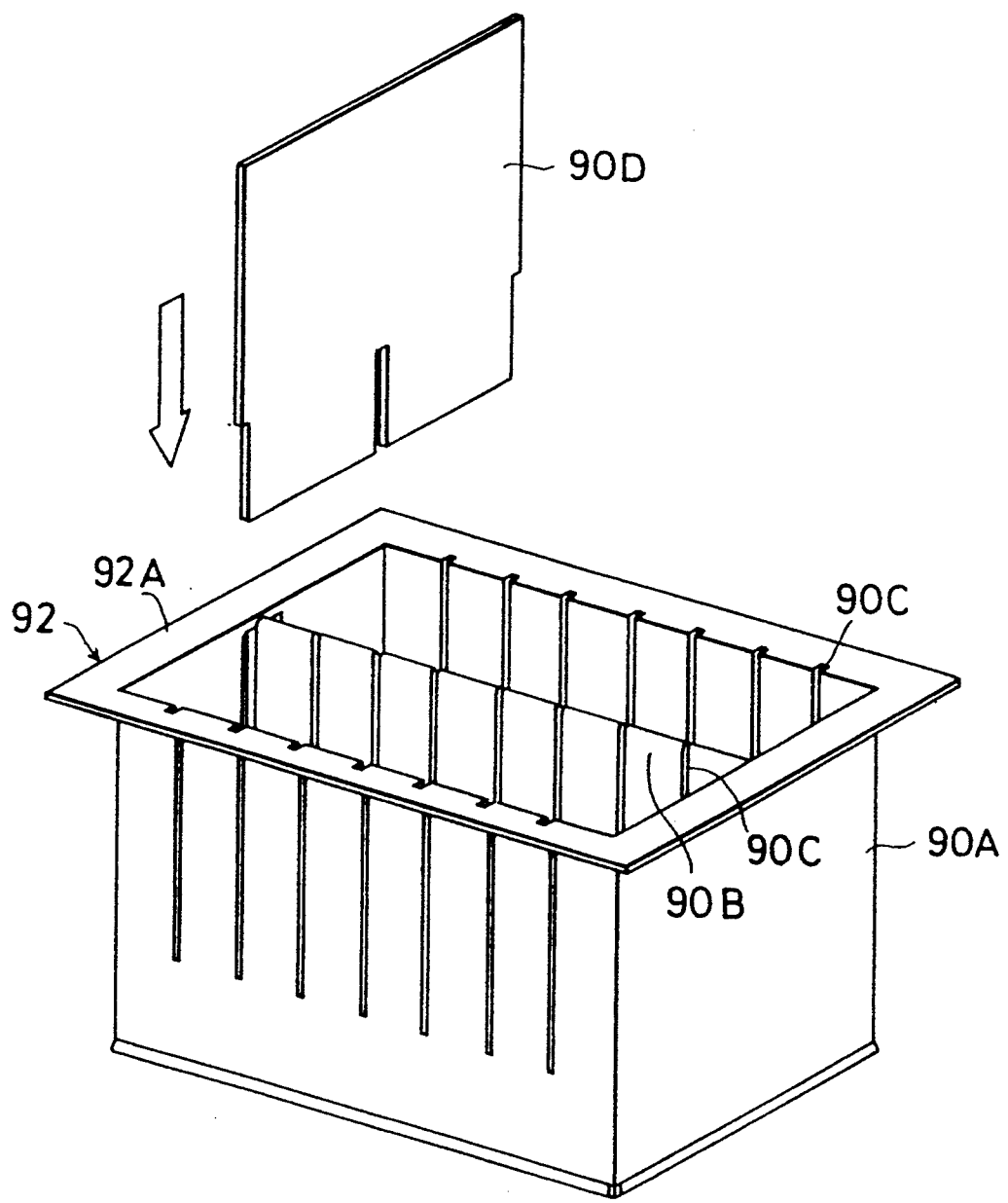
FIG. 23 is a perspective view showing a modified embodiment of the reserve tank.
Figure 25:
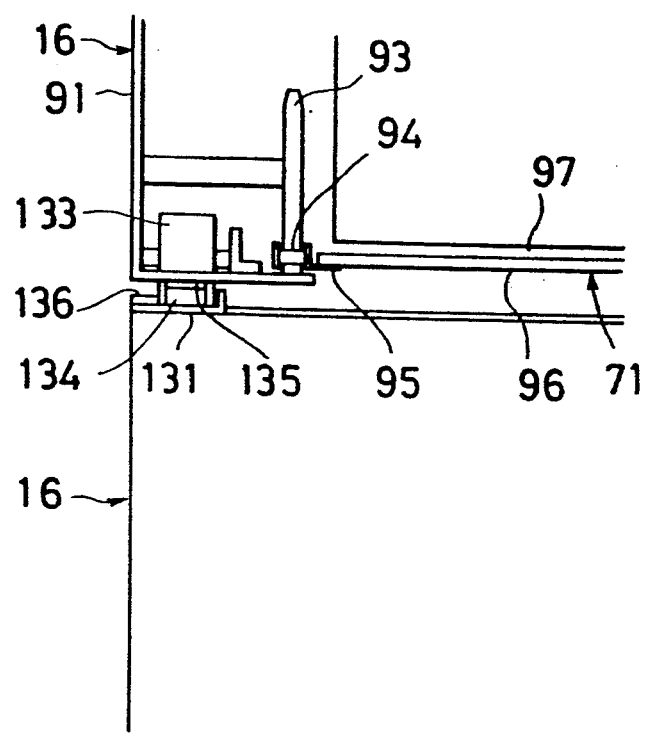
FIG. 25 is an enlarged view of the circled portion indicated by D in FIG. 24(B)

The storage box assembly 92 of the reserve tank 16, as shown in FIG. 23, comprises a partition frame 90A, a center partition wall 90B fixed to the center of the inner portion of the partition frame 90A, and a partition 90D which is detachably inserted into a slit (engaging portion) 90C formed in the center partition wall 90B. At this time, the partitions 90D are inserted into all or a part of the slits 90C, thus enabling to form storage boxes 73 arranged in the required two rows and n lines in the storage box assembly 92. Accordingly, even if the kind of the goods 1 (sizes, number of required storage boxes 73) to be stored in a certain reserve tank 16 is changed, the change can simply be accomodated by inserting the partition 90D into another slit 90C. Also, the system may be designed, in order to cope with all goods 1 handled by the picking system 10, such that the number and sizes of the storage boxes 73 are decided and the slits 90C are provided taking into consideration the number of the slits 90C and at respective distances.

The drop-out device 17, as shown in FIGS. 9 and 10, is designed such that length and breadth partitions 102 are provided in a storage box assembly 101 to form, as previously mentioned, a plurality of storage boxes 74 arranged in two rows and n lines corresponding to the storage boxes 73 of the reserve tank 16 thereabove, thus enabling the storing of a single type or a plurality of goods 1, which are being fed from the storage boxes 73 of the reserve tank 16, in each storage box 74. The storage box assembly 101 of the drop-out device 17 may be designed, as the storage box assembly 92 of the reserve tank 16 already described with reference to FIG. 23, such that the partitions 102 are detachably engageable.

Also, the drop-out device 17 includes the above-mentioned shutter device 72 per every bottom portion of each storage box 74 of the storage box assembly 101. The shutter device 72, as shown in FIGS. 9, 10(A), 10(B), 17(A) and 17(B), is designed such that shutters (opening and shutting members) 104 corresponding to respective storage boxes 74 are mounted on a pivot shaft 103 disposed in the vicinity of a lower end portion of both side walls of the storage box assembly 101. Actuators 105 for opening and shutting the shutters 104 are disposed on the external walls of both sides of the storage box assembly 101. At this time, the operation ranges of the actuators 105 and the shutters 104 are determined or limited within the external dimension of the upper reserve tank 16 in order to realize a compact apparatus.

Figure 17A:
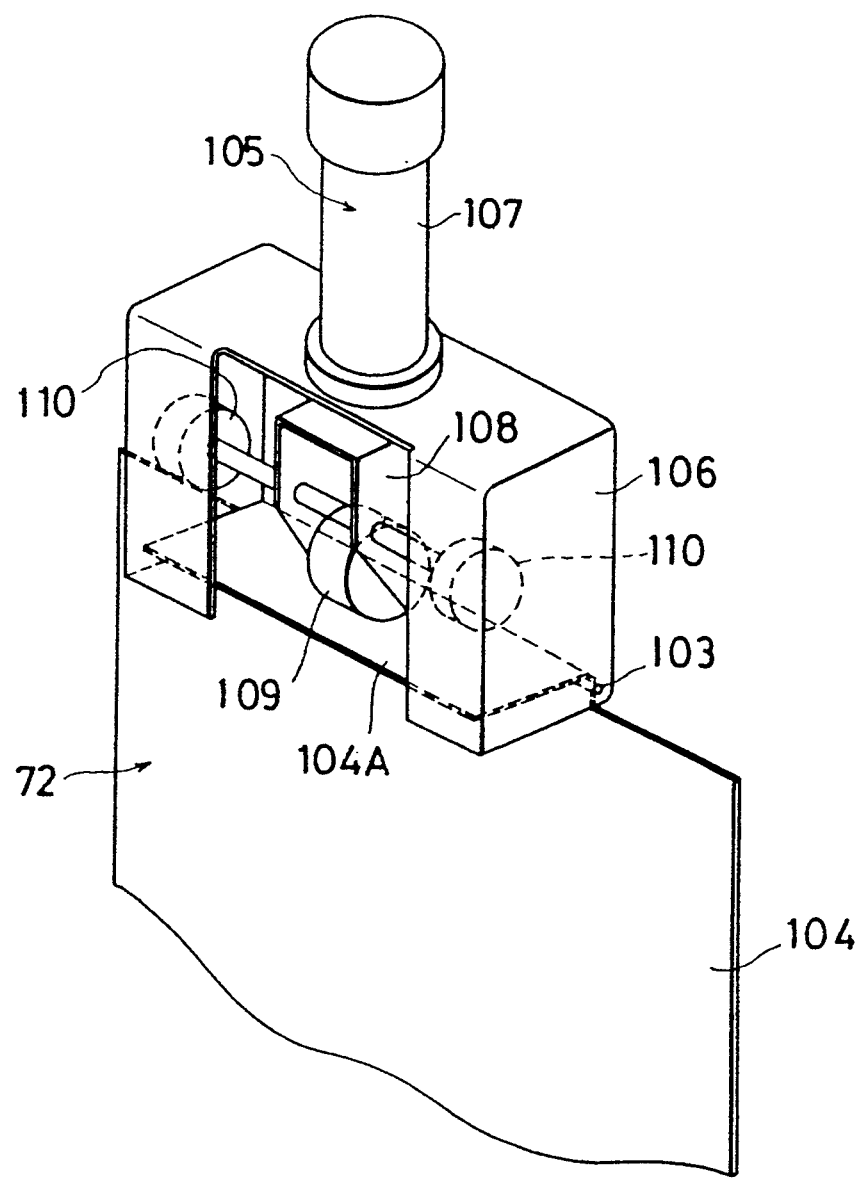
FIGS. 17(A) and 17(B) are perspective views showing a shutter drive device used in the drop-out device.
Figure 17B:
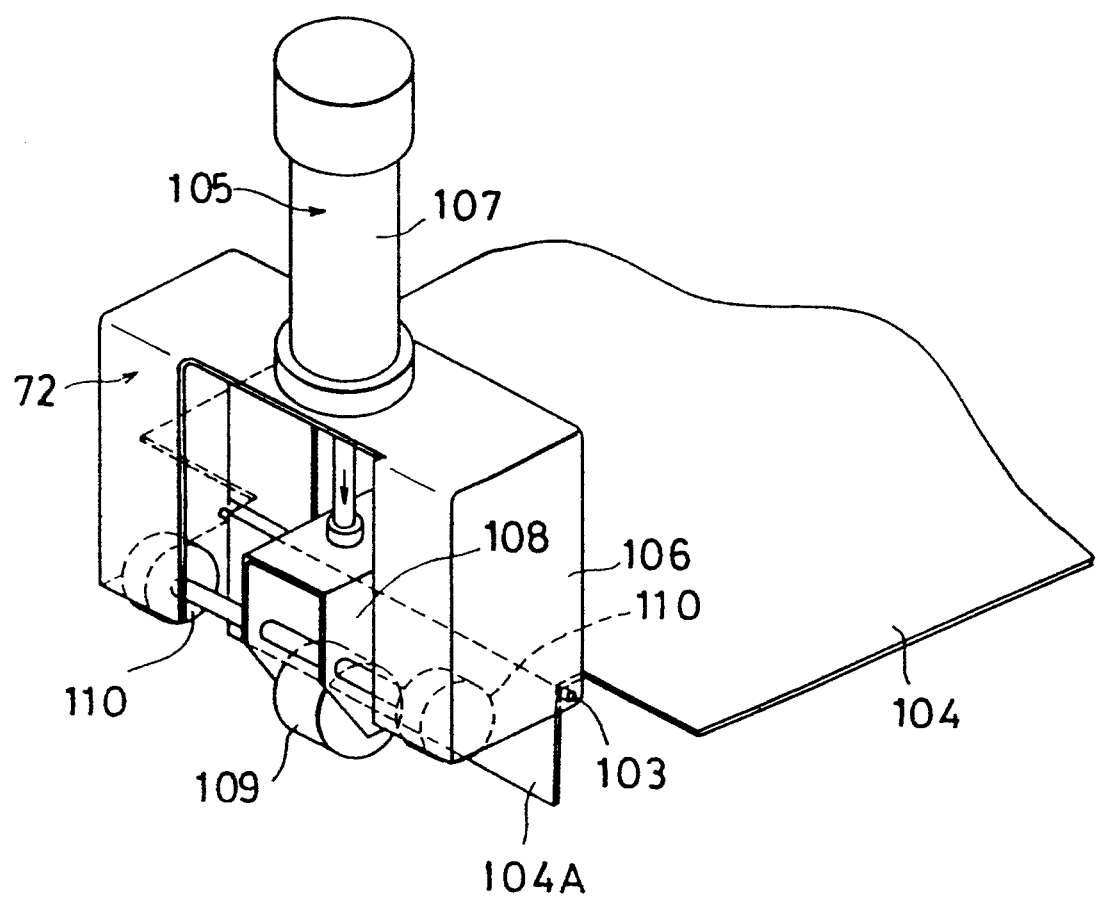

Each of the actuators 105 of the shutters 104 includes a guide housing 106 fixed to the storage box assembly 101, a cylinder 107 fixed to the guide housing 106, a roller support member 108 which is caused to move upwardly and downwardly by the cylinder 107, a push roller 109 supported by the roller support member 108 and adapted to push down an L-shaped bent portion at an upper end of the shutter 104, and a pair of guide rollers 110 guided by both inner surfaces of the guide housing 106 in the state where the rollers 110 are supported by the inner surfaces on both sides of the guide housing 106 and adapted to backup a reaction force of the shutter 104 which is prevailed on the push roller 109 by the shutter 104. Owing to the foregoing construction, in the drop-out device 17, a required shutter device 72 is actuated by a picking control device, and the cylinder 107 of the shutter device 72 is extended as shown in FIG. 17(B), to thereby push in the shutter 104 for shutting or closing through the push roller 109 in order to store and maintain the goods 1 in the above-mentioned storage box 74. On the other hand, by contracting the cylinder 107 of the shutter device 72 as shown in FIG. 17(A), the push-in of the shutter 104 by the push roller 109 is canceled, to thereby open the shutter 104 by its dead weight, so that the goods 1 can be discharged downwardly from the bottom of the storage box 74.

Figure 18A:
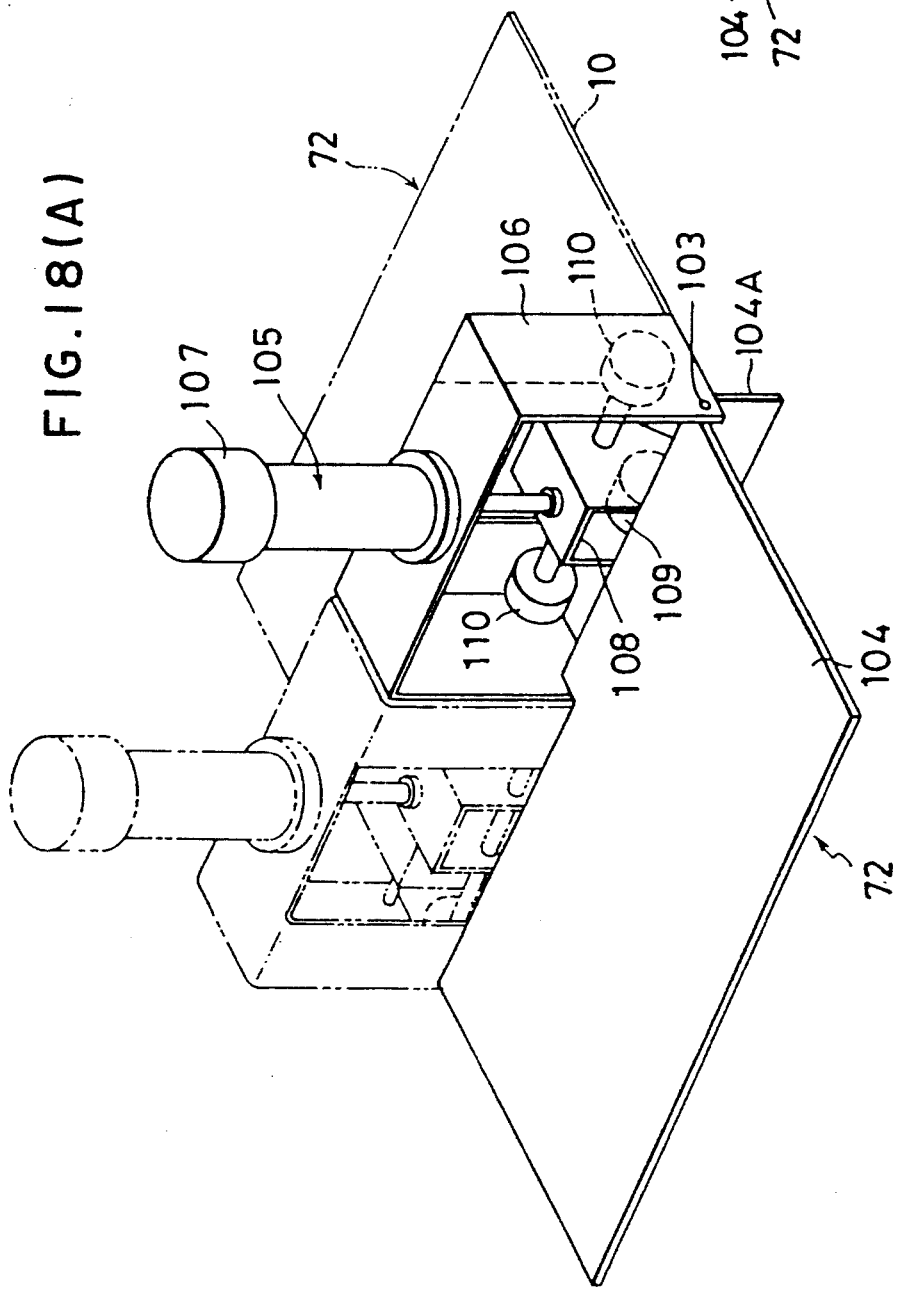
FIG. 18(A) is a perspective view showing a modified embodiment of the shutter drive device.
Figure 18B:
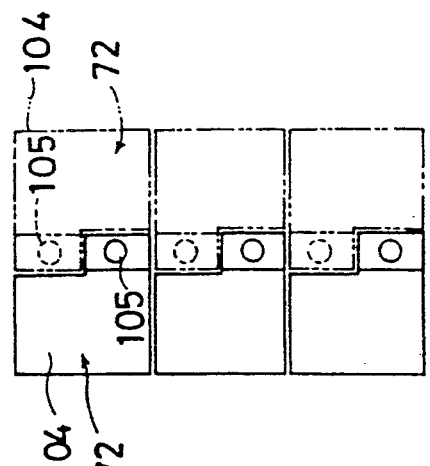
FIG. 18(B) is a plan view showing an important part of the drop-out device in which the shutter drive device of FIG. 18(A) is used.

In the picking apparatus 14 shown in FIG. 10(A), the actuator 105 disposed on the external wall of the left-hand side drop-out device 17 and the actuator 105 disposed on the external wall of the right-hand side drop-out device 17 are arranged in a back-to-back relation between the laterally adjacent drop-out devices 17. However, in practicing the present invention, as is shown in FIGS. 18(A) and 18(B), the actuator 105 disposed on the external wall of the left-hand side drop-out device 17 and the actuator 105 disposed on the external wall of the right-hand side drop-out device 17 may be alternately arranged in one line higher position. According to this arrangement, the space for installing the adjacent drop-out devices 17 can be further reduced and the whole size of the picking apparatus 14 can be made more compact.

Figure 19:
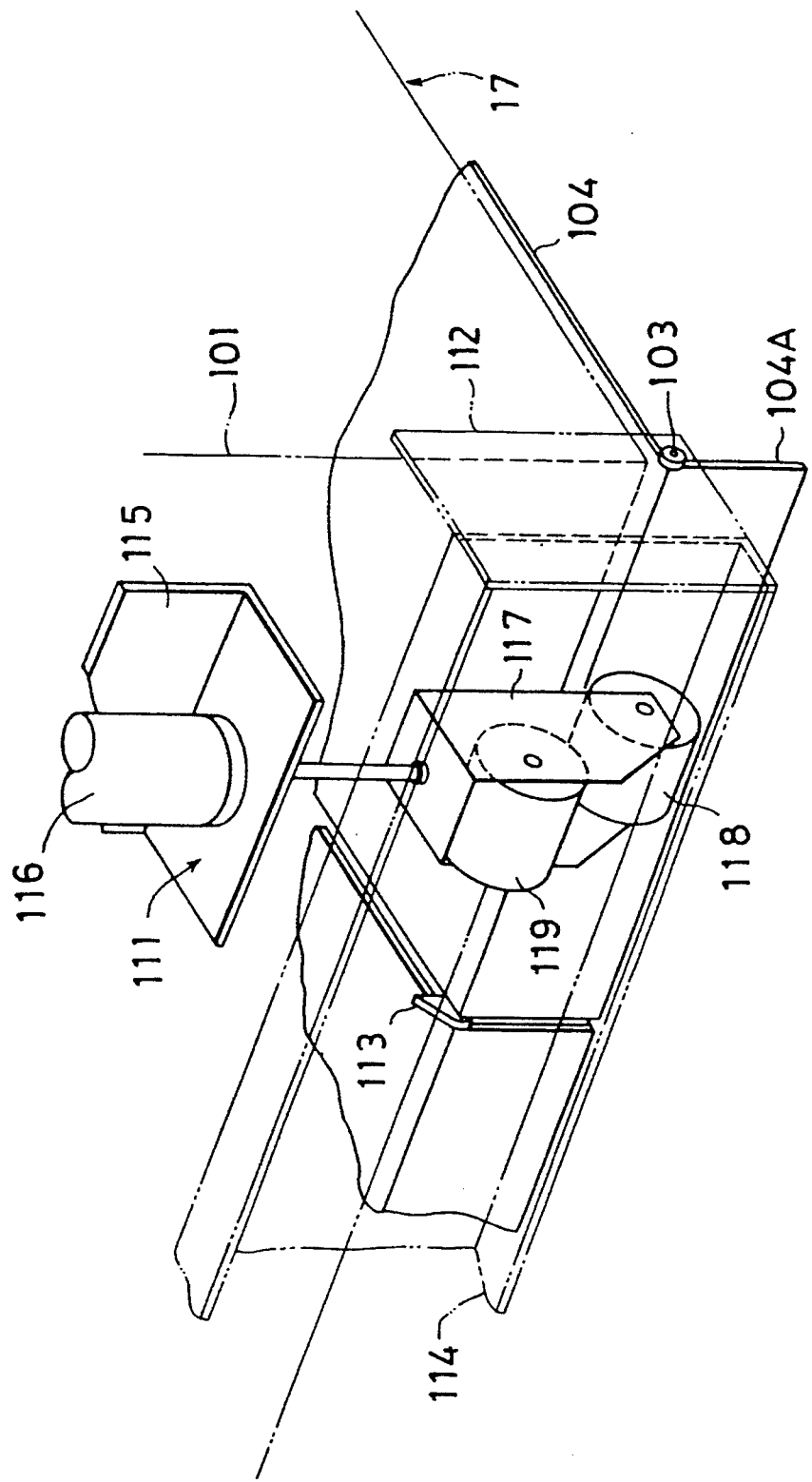
FIG. 19 is a perspective view showing another modified embodiment of the shutter drive device.
Figure 20A:
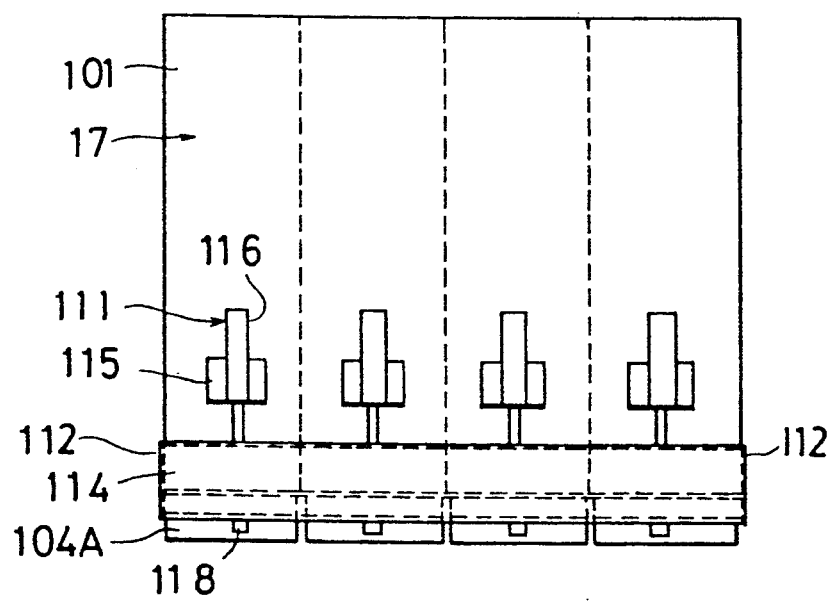
FIGS. 20(A) and 20(B) are schematic views showing the drop-out device in which the shutter drive device of FIG. 19 is used.
Figure 20B:
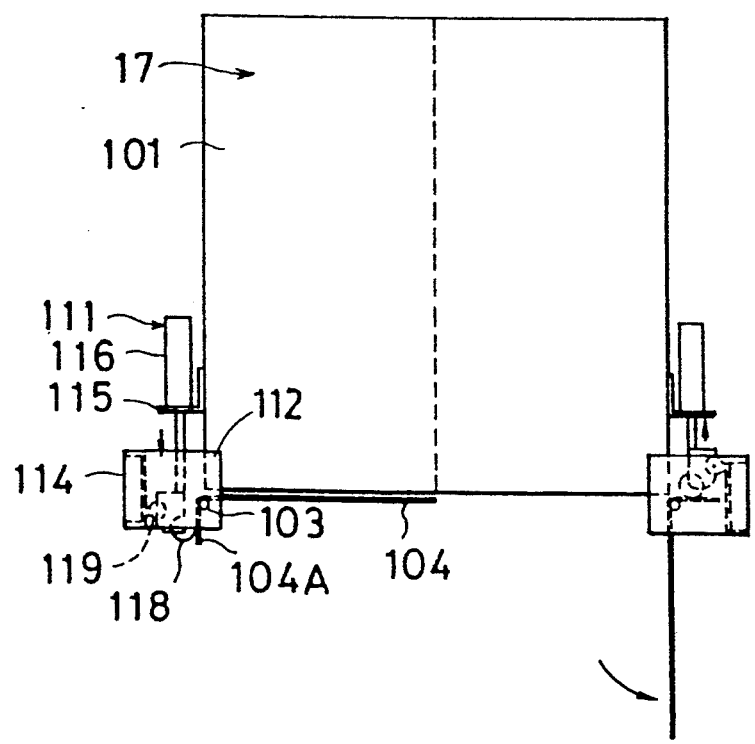

Also, the actuator 105 of the shutter device can be comprised of an actuator 111 as shown in FIGS. 19, 20(A) and 20(B). The actuator 111 comprises a support plate 112 fixed to a lower end portion of an external wall directing forwardly and backwardly of the storage box assembly 101, a pivot shaft 103 of the shutter 104 supported by a support element 113 mounted on a storage box assembly 101, and a guide housing 114 fixed to the support plate 112. At this time, the pivot shaft 103 and the guide housing 114 are common continuously formed members over the entire range of whole storage boxes 74. The support element 113 may be mounted on the guide housing 114. The actuator 111 is comprised of a cylinder bracket 115 fixed to an external wall of the storage box assembly 101, a cylinder 116 fixed to the bracket 115, a push roller 118 supported on a roller support member 117 which is moved upward and downward by the cylinder 116, and a single guide roller 119 supported by said roller support member 117 in an upper location of said push roller 118. According to this construction, as the guide roller 119 is unitized, the dimension becomes compact. As the pivot shaft 103 supporting the shutter 104 and the guide housing 114 are used as continuously formed members, the structure is simplifies.

Figure 21:
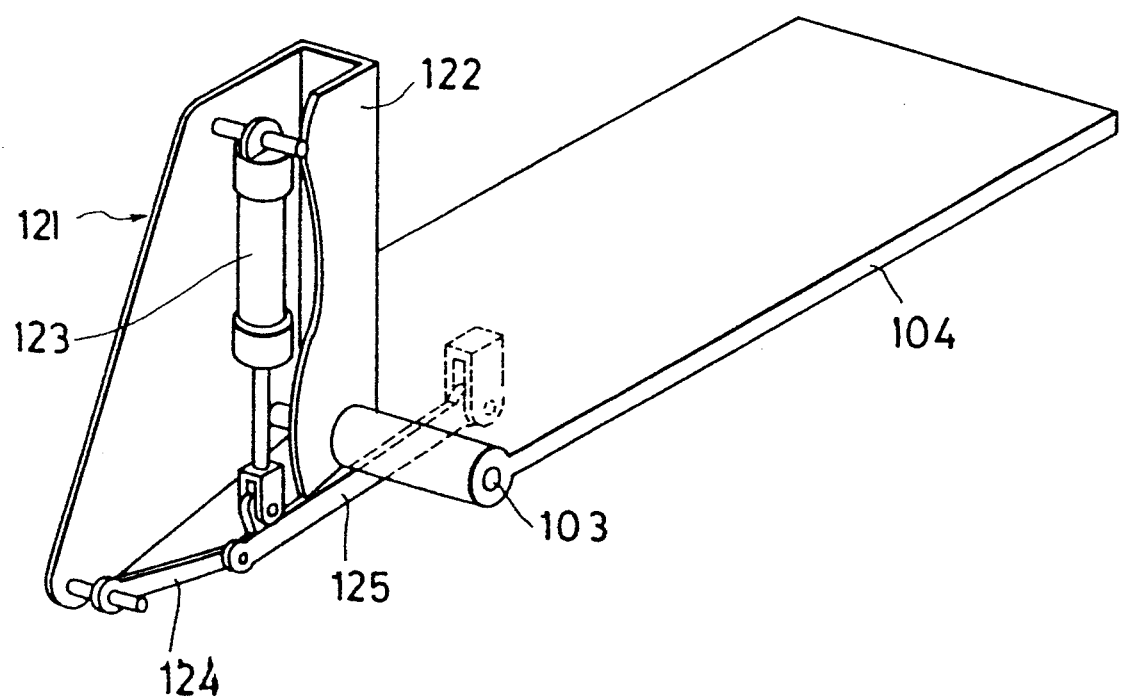
FIG. 21 is a perspective view showing still another modified embodiment of the shutter drive device.
Figure 22:
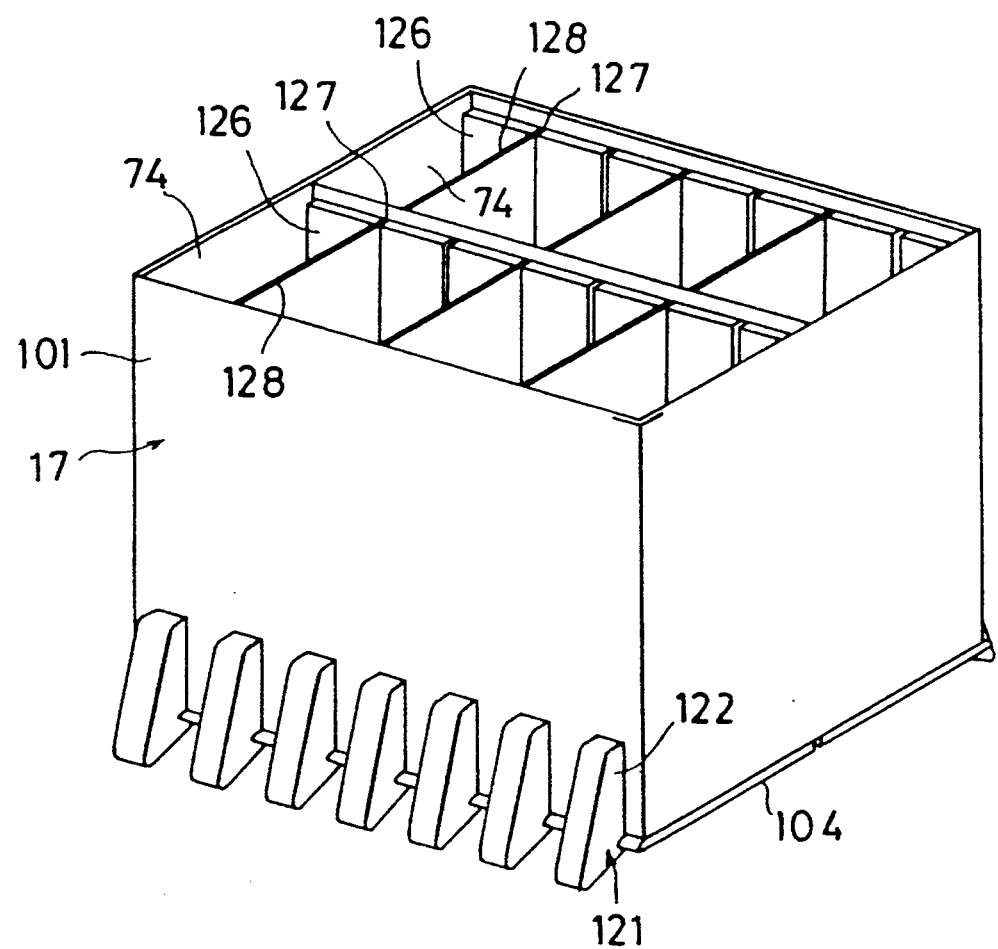
FIG. 22 is a perspective view showing a modified embodiment of a drop-out device in which the shutter drive device of FIG. 21 is used.

Also, the actuator 105 of the shutter device 72 can be comprised of an actuator 121 as shown in FIGS. 21 and 22. The actuator 121 has a mounting bracket 122 fixed to an external wall of a storage box assembly 101, a pivot shaft 103 of the shutter 104 supported on the mounting bracket 122, and a cylinder 123 supported on the mounting bracket 122 through a trunnion. Two links 124 and 125 constituting a toggle mechanism are bridged between the mounting bracket 122 and the shutter 104, so that the link 125 can be driven by the cylinder 123.

The storage box assembly 101 of the drop-out device 17, as shown in FIG. 22, may be provided with right-and-left and center partition walls 126 therein, so that partitions 128 can be detachably engaged in slits 127 formed in the respective partition walls 126. At this time, the partitions 128 are engaged in all of or a part of the slits 127, thus enabling the formation of such storage boxes 74 arranged in the required two rows and n lines within the storage box assembly 101. In FIG. 22, as the size of the shutter 104 serves to determine the pitch of the slits 127, it is required to operate two adjacent actuators 121 in order to open storage boxes 74 for two pitches. At that time, it may also be designed such that the size of the shutter 104 is changed to correspond to two pitches so as to be actuated by a single actuator 121.

Next, the construction for pulling out the inner side reserve tank 16 in the picking apparatus 14 toward the gravity flow rack 13 side for movement will now be described with reference to FIGS. 11 through 14, 24(A) and 24(B), and 25.

Peripheral flange portions 92A on both sides of the reserve tank body 91 constituting the reserve tank 16 on this side, and upper end portions on both sides of the storage box assembly 101 constituting the drop-out device 17 on the inner side, are provided with continuous guide rails 131 (FIG. 11) and 132. Two front and rear free rollers 133 (FIG. 13(A)) are rotatably supported on each lower end portion of inner walls on both sides of the reserve tank body 91 which constitutes the inner side reserve tank 16, the free rollers 133 being placed on the guide rails 131 and 132.

At that time, as shown in FIG. 13(B), the right and left front free rollers 133 are displaced by distance P in their mounting positions relative to each other in the forward and backward direction, while the right and left rear free rollers 133 are displaced by distance P in their mounting positions relative to each other in the forward and backward direction. The distance P is set to be larger than a gap of a joint of the front and rear guide rails 131 and 132, so that the free roller 133 can smoothly travel on the joint area between the guide rails 131 and 132.

A front end portion of the guide rail 131 disposed at the reserve tank 16 on one side is provided with a rail side stopper 134, while a front portion of the front free roller 133 of the inner side reserve tank 16 is provided with a reserve tank side stopper 135, so that a limit position for drawing out the inner side reserve tank 16 traveling on the guide rails 131 and 132 can be restricted by engagement between the stoppers 134 and 135.

Also, a front end portion of the guide rail 131 disposed at the reserve tank 16 on this side is provided with a drawing limit position holding stopper 136 which is to be climbed over by the front free roller 133 of the inner side reserve tank 16 which stays in the drawing limit position and which is engaged with a rear surface of the free roller 133.

Also, a rear end portion of the guide rail 132 disposed at the inner side drop-out device 17 is provided with an original position holding stopper 137 which is to be climbed over by the rear free roller 133 of the inner side reserve tank 16 which stays in the original position and which is engaged with the free roller 133 in such a manner as to sandwich both the front and rear surfaces of thereof.

A front surface of the inner side reserve tank 16 is provided with a handle 138. Owing to the provision of this handle 138, the worker moves the free rollers 133 along the guide rails 131 and 132 by an operating force applied to the handle 138, to thereby cause the inner side reserve tank 16 to be moved between the above-mentioned original position and the drawing limit position and to stay in a selected one of the two positions.

Figure 26:
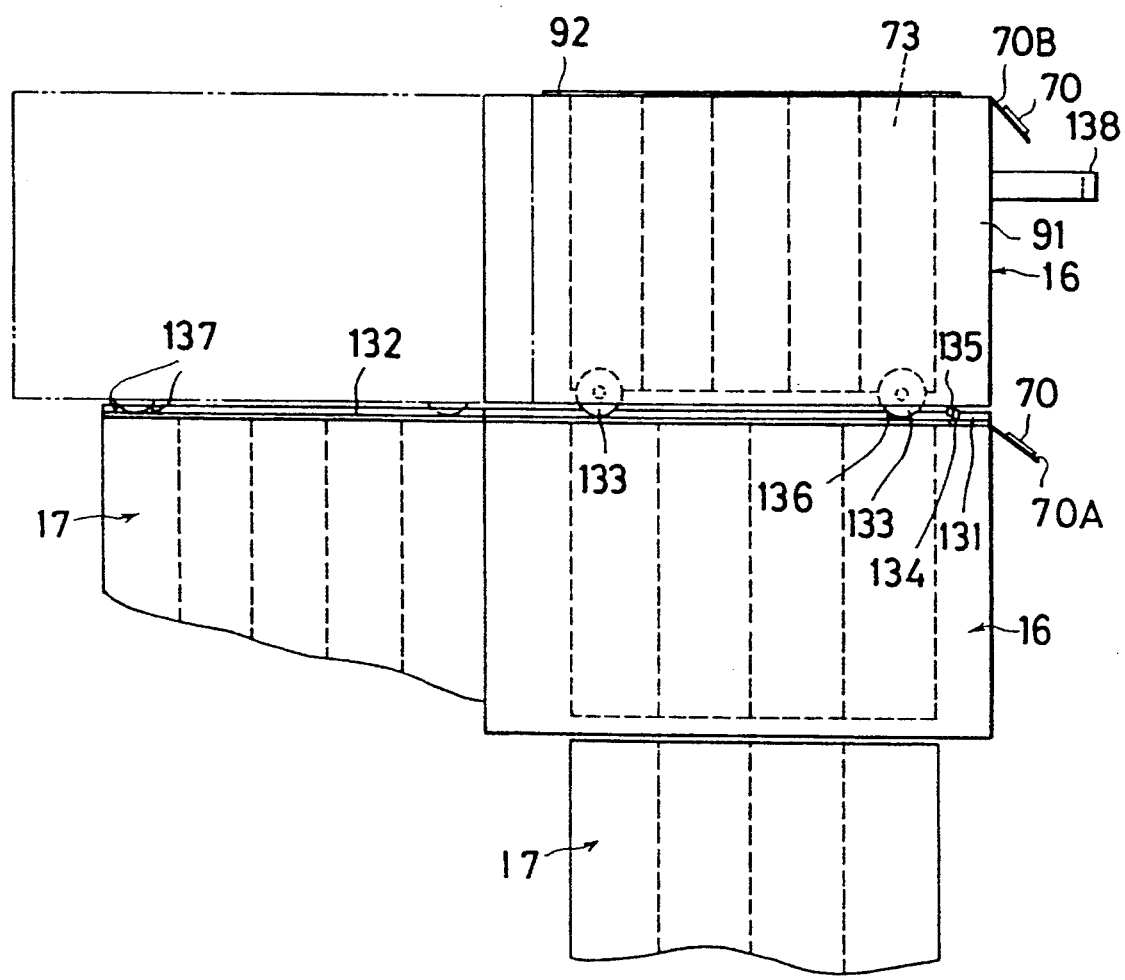
FIG. 26 is a schematic view showing a modified embodiment of a pull-out reserve tank.

In the picking apparatus 14 shown in FIG. 24(A), a predetermined gap is provided between a rear end face of the reserve tank 16 on this side and a front end face of the inner side drop-out device 17. However, in the embodiment of the present invention, the gap may be omitted as shown in FIG. 26.

Also, the picking apparatus 14, as shown in FIGS. 27(A) and 27(B), may be designed such that a frame member 141 formed of an H-type steel member (an I beam) and a groove-type or channel-type steel member supports the reserve tank 16, and the drop-out devices 17 hang therefrom. That is, the reserve tank 16 has both side flange portions 142 disposed on an upper end face of the reserve tank body 91 and supported by a lower flange portion of the frame member 141, while the drop-out device 17 has both side flange portions 143 disposed on an upper end face of the storage box assembly 101 and supported by a lower flange portion of the frame member 141.

In FIG. 27(A), the indicator mounting member 70C, on which is provided a shifting requirement indicator 70 of the inner side reserve tank 16, is formed of a common continuous member to all of the laterally adjacent reserve tanks 16 as in the indicator mounting member 70A on which the shifting requirement indicator 70 of the reserve tank 16 is mounted on this side. The inner side reserve tank 16 is drawn out passing under the indicator mounting member 70C.

Also, in FIG. 27(A), upper surfaces of both side flange portions 142 of the reserve tank 16 and upper surfaces of both side flange portions 143 of the inner side drop-out device 17 are respectively provided with a step portion 144 serving as a guide rail. The free rollers 133 disposed on the inner side reserve tank 16 are placed on the step portions 144.

Also, in FIG. 27(A), a front end portion of an upper surface of the upper flange portion of the frame member 141 is provided with a stopper 145, and a front end portion of the external wall of the inner side reserve tank 16 is provided with a draw-out preventing pin 146, so that the drawing limit position of the inner side reserve tank 16 moving on the step portion 144 is restricted by engagement between the stopper 145 and the pin 146.

Front end portions of the upper surfaces of both side flange portions 142 of the reserve tank 16 are respectively provided with a roller stop recess portion 147 for permitting the front free roller 133 of the inner side reserve tank 16, which stays in the above-mentioned drawing limit position, to drop there in.

Rear end portions of the upper surfaces of both side flange portions 143 of the inner side drop-out device 17 are respectively provided with a roller stop recess (not shown) for permitting the rear free roller 133 of the inner side reserve tank 16, which stays in the original position, to drop therein.

A lower end portion of the external wall of the inner side reserve tank 16 is provided with a floating preventing pin 149 which is to be engaged with a lower surface of the upper flange portion of the frame member 141, in order to prevent the moving reserve tank 16 from being floated up.

(E) Container Carrying Line

Figure 1B:
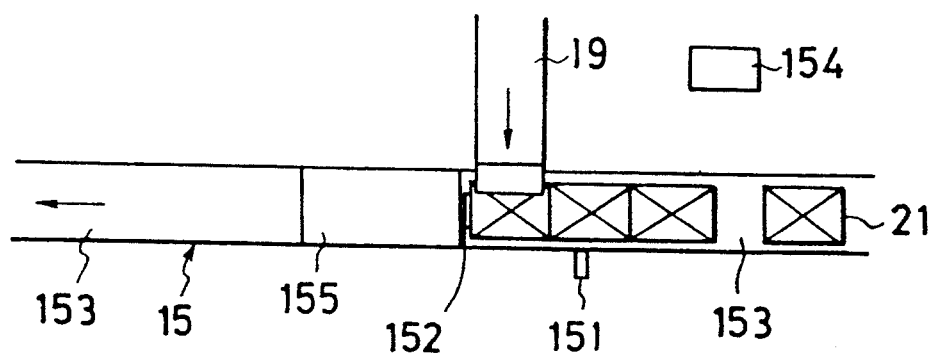
FIG. 1(B) is a plan view of an important part of the invention, showing a container carrying line.

The container carrying line 15 is provided, as shown in FIG. 1(B), with a bar code reader 151 and a stopper 152 in order to stop a container which is to pick up the goods 1 from the picking apparatus 14 at a goods feeding portion by a shoot conveyor 19 of each picking apparatus 14 which is formed as a unit as mentioned previously. That is, the container 21 transferred by a carrying conveyor 153 of the container carrying line 15 has a bar code label which is attached to the side surface of the container 21. The label is read by the bar code reader 151, and a conveyor control device 154 judges whether the container 21 is the right one to which goods 1 are required to be fed at the feeding portion based on the reading result of the bar code reader 151. When the judgment of the conveyor control device 154 is Yes, it causes the stopper 152 to be projected to stop the container 21 and the goods 1 collected on the shoot conveyor 19 are fed into the container 21. During this feeding, as shown in FIG. 1(B), a succeeding container 21 reaches or catches up with the top container 21 and is stored. When the judgment is negative, the stopper 152 is held in a lowered position to permit the container 21 to pass. When the feeding is over, the conveyor control device 154 causes the stopper 152 to be lowered in order to permit the container 21 to start traveling. The succeeding container 21 is also succeedingly permitted to start traveling. Then, the container 21 is accelerated by a high speed separating conveyor 155 and separated from the succeeding container 21. Owing to this separation, a gap is created between the leading container 21 and the succeeding container 21, and therefore, the succeeding container 21, where necessary, can be stopped by projecting the stopper 152 before it arrives at the stopper 152. When being transferred from the separating conveyor 155 onto the carrying conveyor 153, the container 21 is decelerated and sent to the next feeding portion. The container carrying line 15 may be designed such that a plurality of driving conveyors (not shown) capable of transferring a single container 21 independently are arranged in series and the container 21 on the driving conveyor is controlled whether it can be carried to the lower driving conveyor and transferred, if feasible.

Next, operation of the picking system 10 will be described with respect to the following items: (1) picking operation, (2) collecting/feeding operation, (3) shifting operation to a reserve tank, and (4) supplying operation to the gravity flow rack (see FIG. 33).

Figure 33:
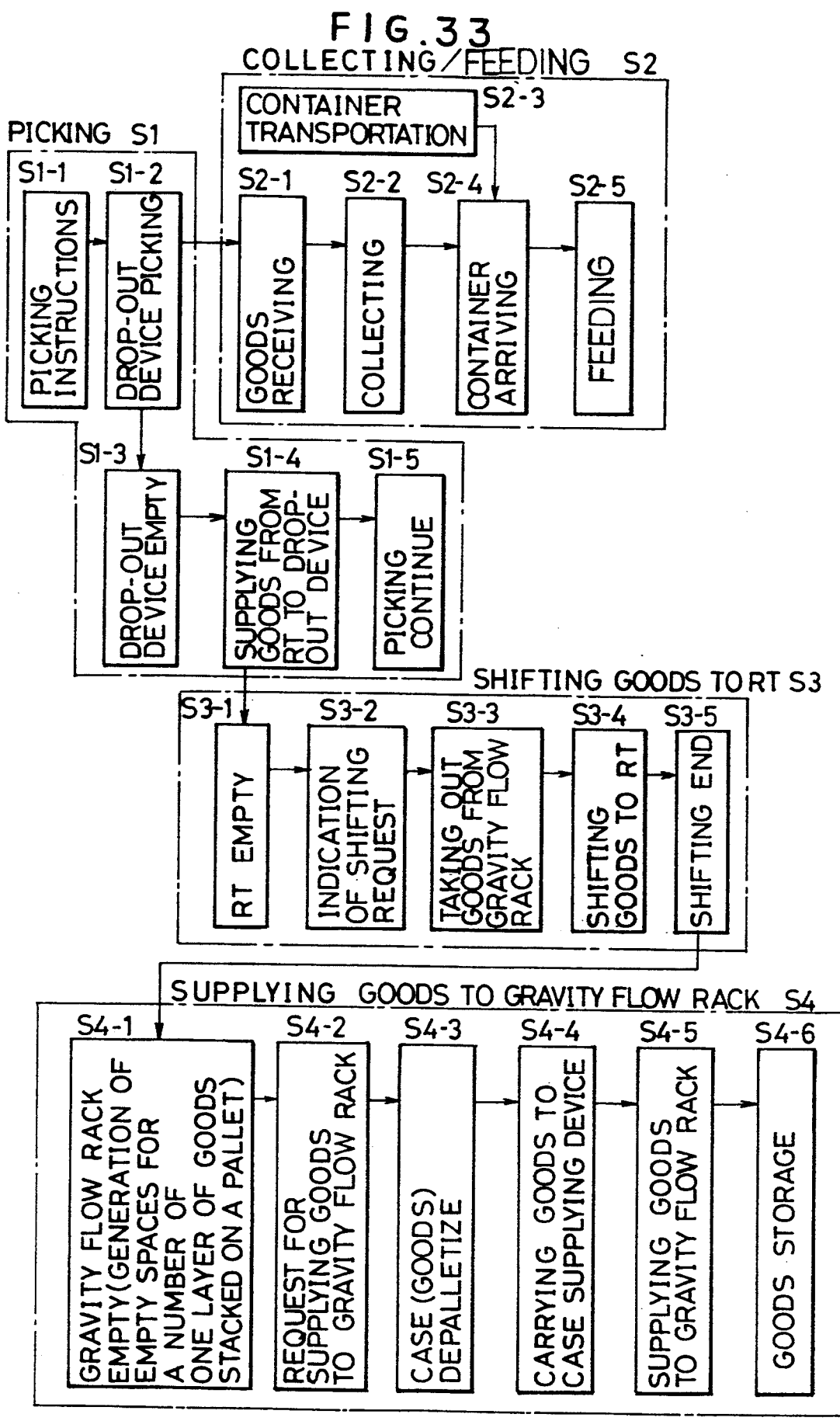
FIG. 33 is a flowchart showing the control steps in the picking system to which the present invention is applied.
Figure 34A:
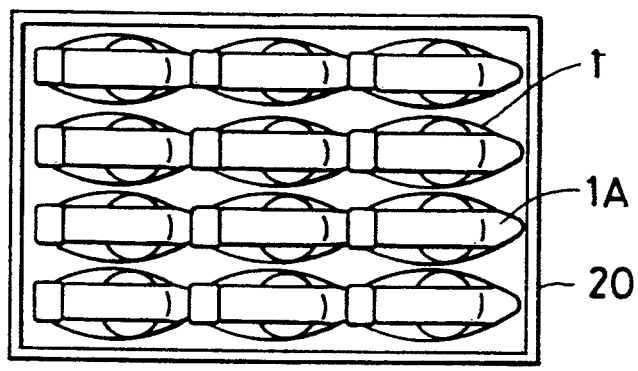
FIG. 34(A) is a plan view showing goods each having a sprayer type cap stored in a case.
Figure 34B:
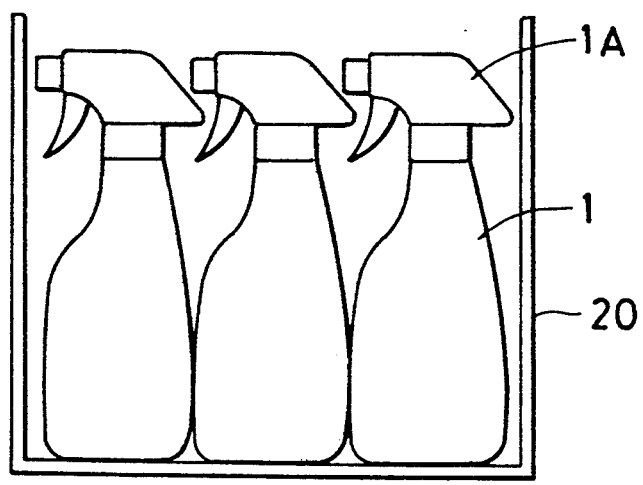
FIG. 34(B) is a front view thereof.
Figure 35A:
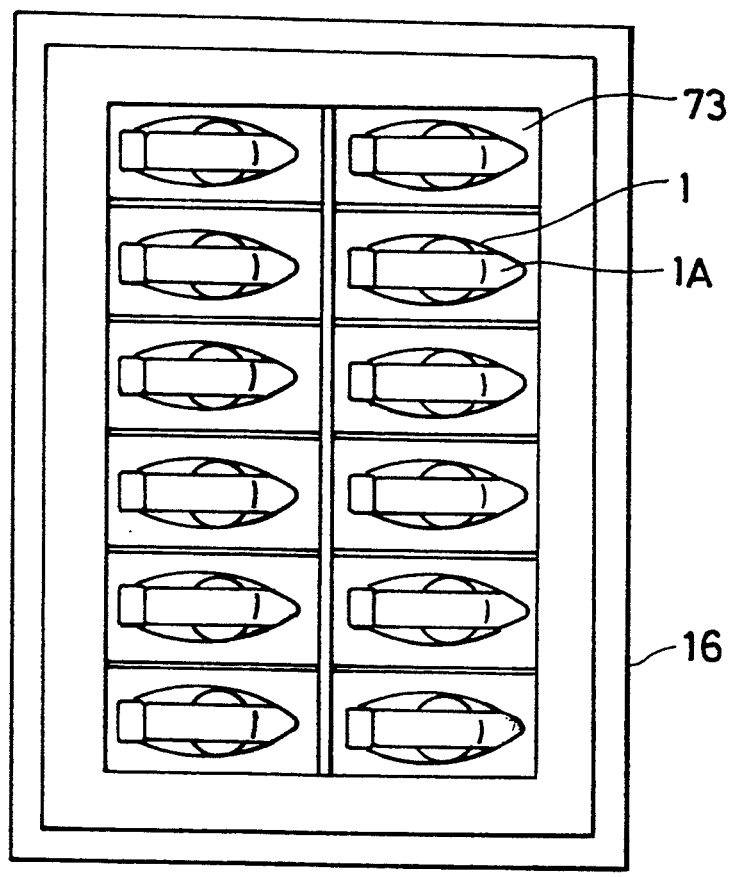
FIG. 35(A) is a plan view showing the goods of FIG. 34(A) shifted to the reserve tank.
Figure 35C:
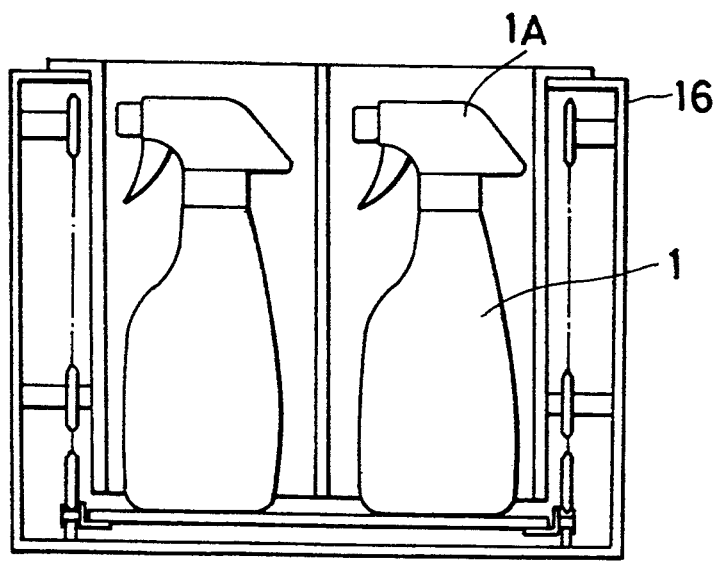
FIG. 35(C) is a front view corresponding to the plan views of FIGS. 35(A) and 35(B)
Figure 35B:
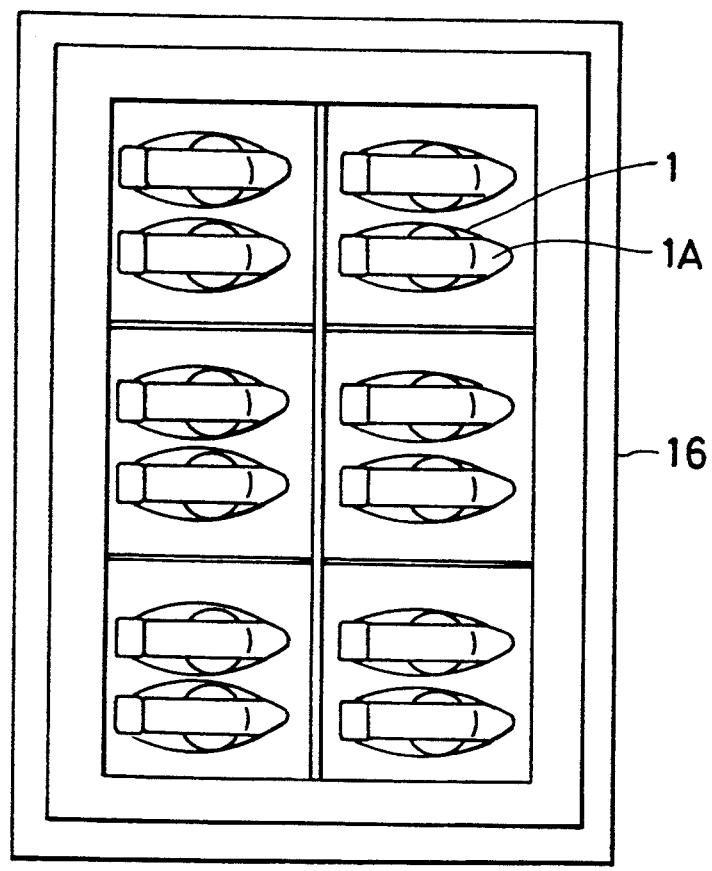
FIG. 35(B) is a plan view showing the goods of FIG. 34(A) shifted to another reserve tank which has partitions in different positions from those of FIG. 35(A)
Figure 36A:
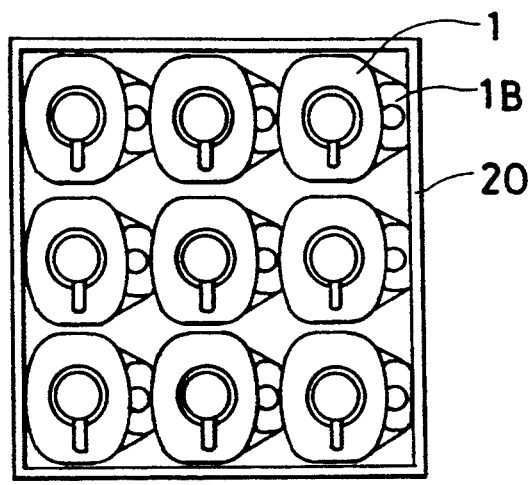
FIG. 36(A) is a plan view showing goods each having a premium merchandise stored in a case.
Figure 36B:
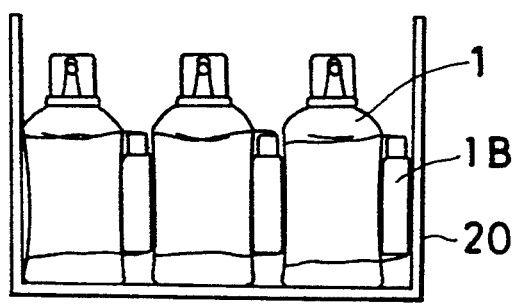
FIG. 36(B) is a front view thereof.
Figure 37A:
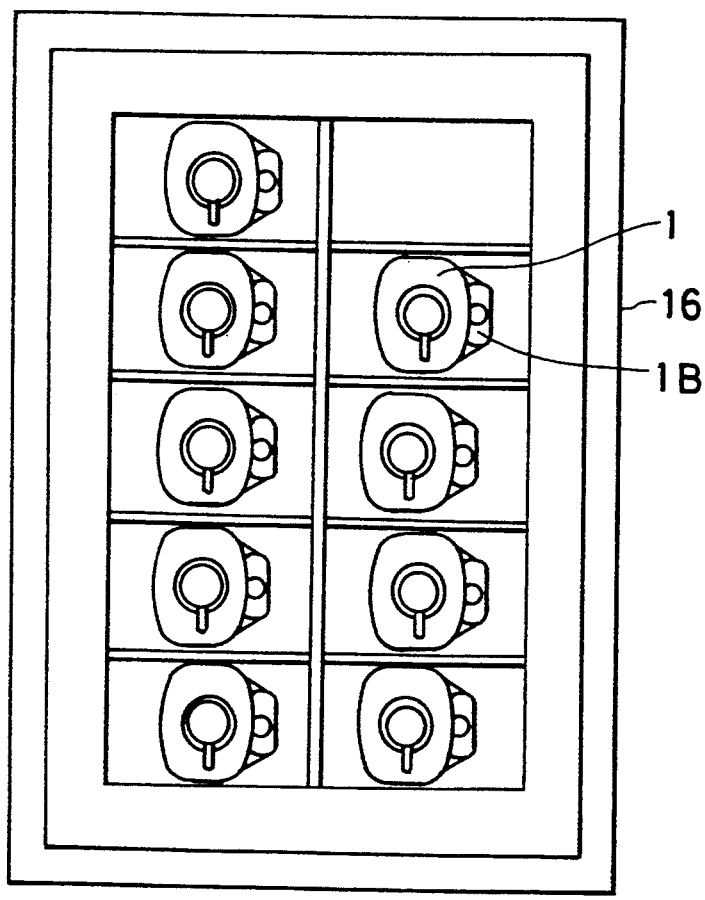
FIG. 37(A) is a plan view showing the goods of FIG. 36 shifted to the reserve tank.
Figure 37B:
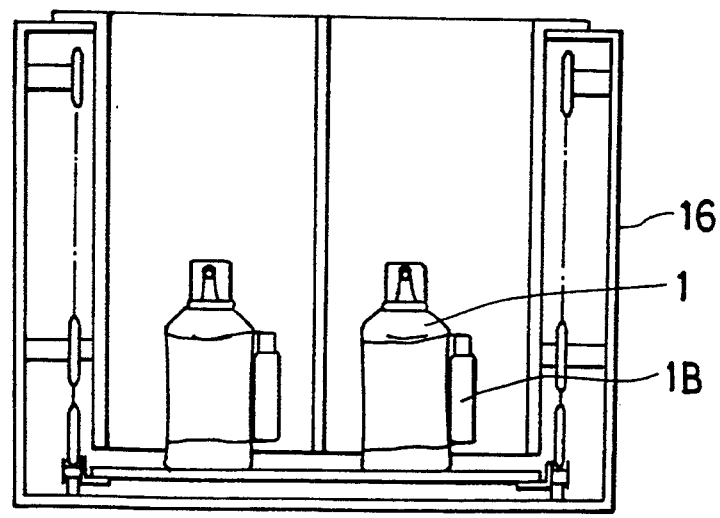
FIG. 37(B) is a front view thereof.
Figure 38A:
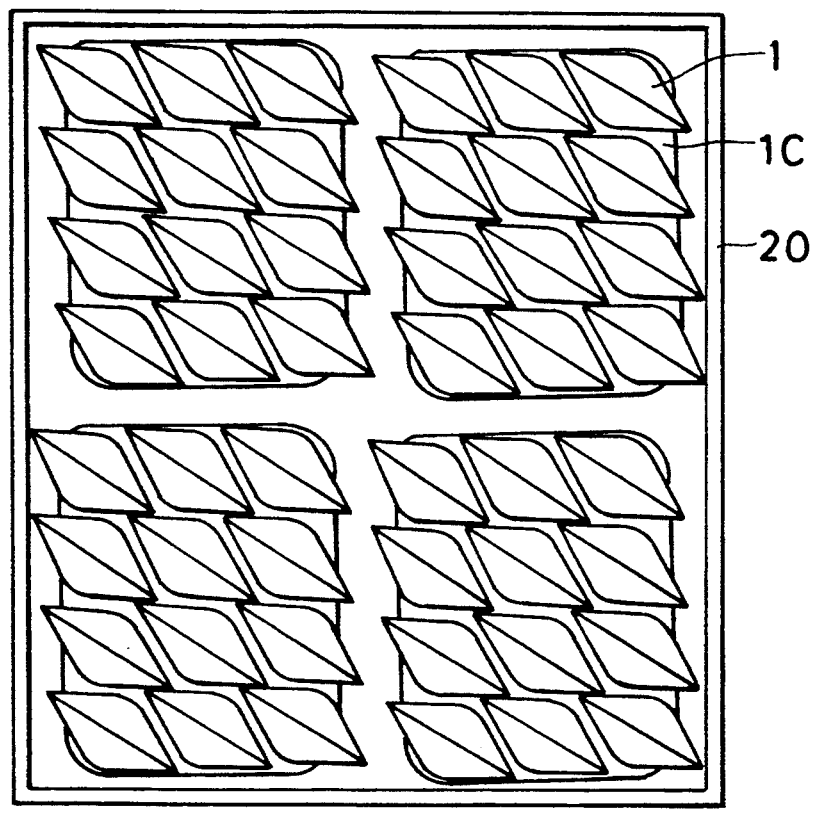
FIG. 38(A) is a plan view showing goods inserted in trays stored in a case.
Figure 38B:
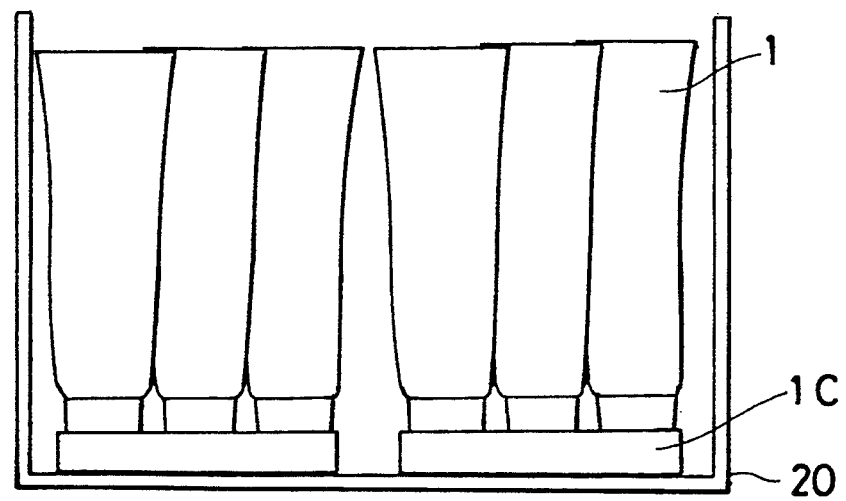
FIG. 38(B) is a front view thereof.
Figure 39A:
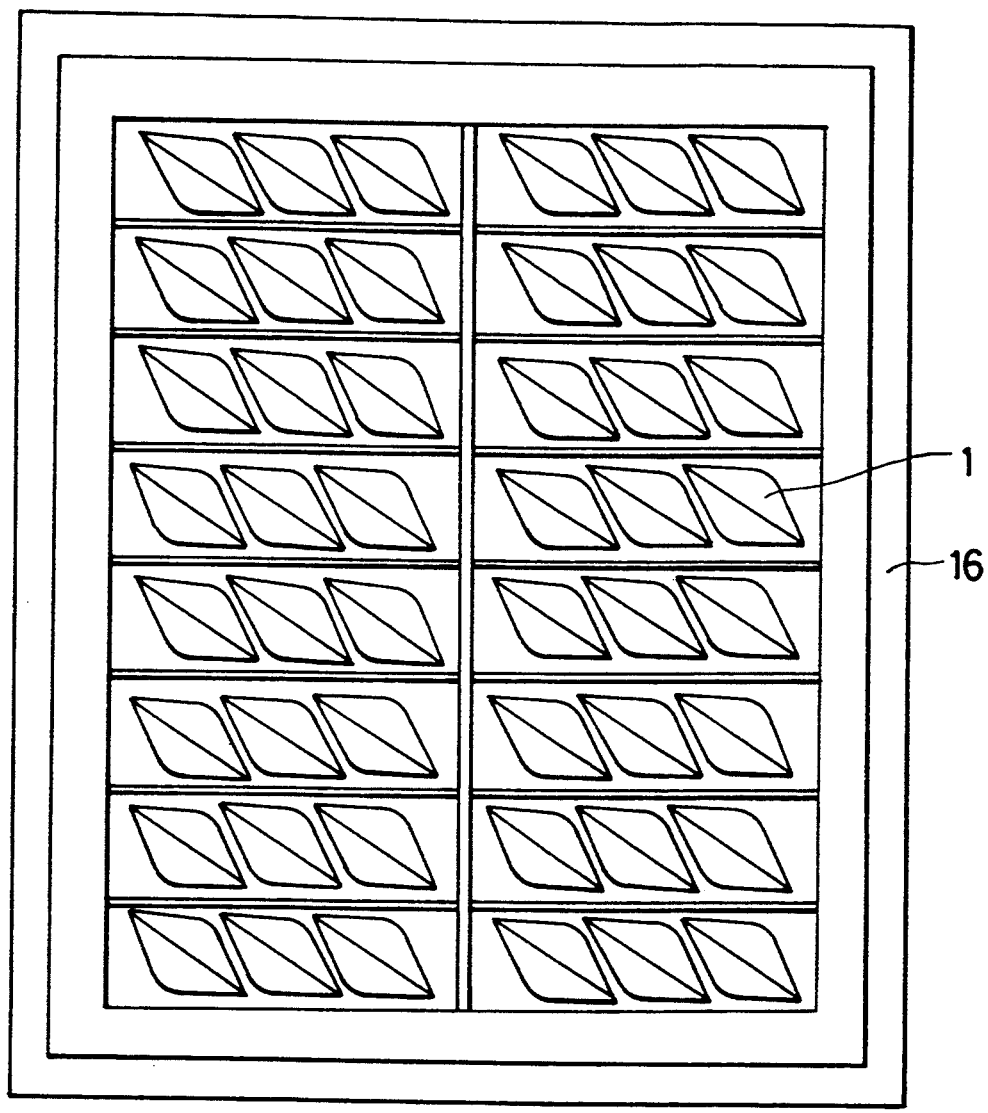
FIG. 39(A) is a plan view of the goods of FIG. 38(A) shifted to the reserve tank.
Figure 39B:
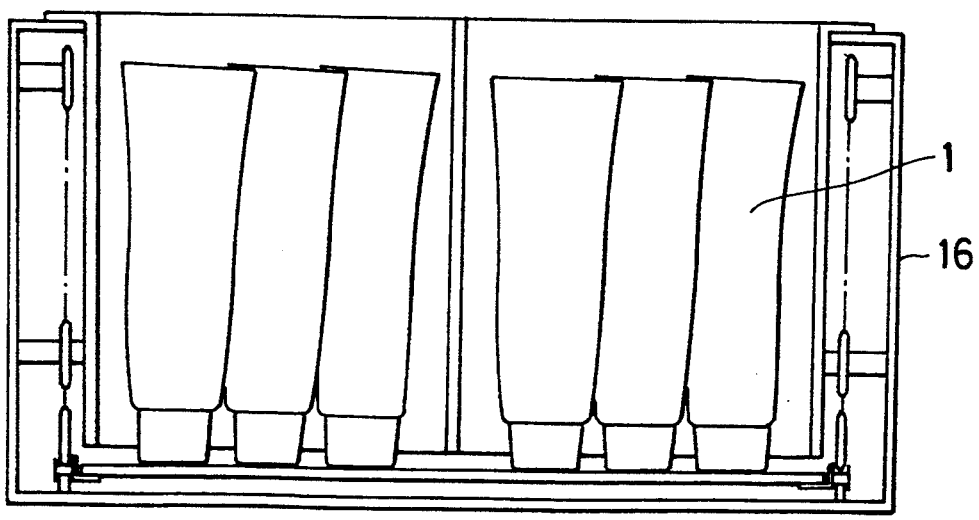
FIG. 39(B) is a front view thereof.
Figure 40A:
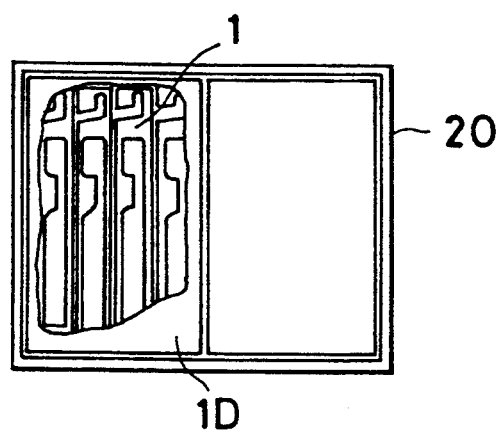
FIG. 40(A) is a plan view showing goods stored in inner boxes stored in a case.
Figure 40B:
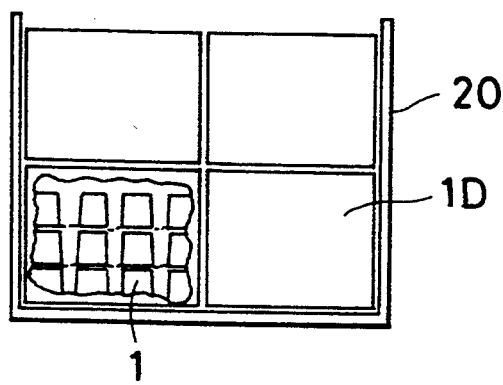
FIG. 40(B) is a front view thereof.
Figure 41A:
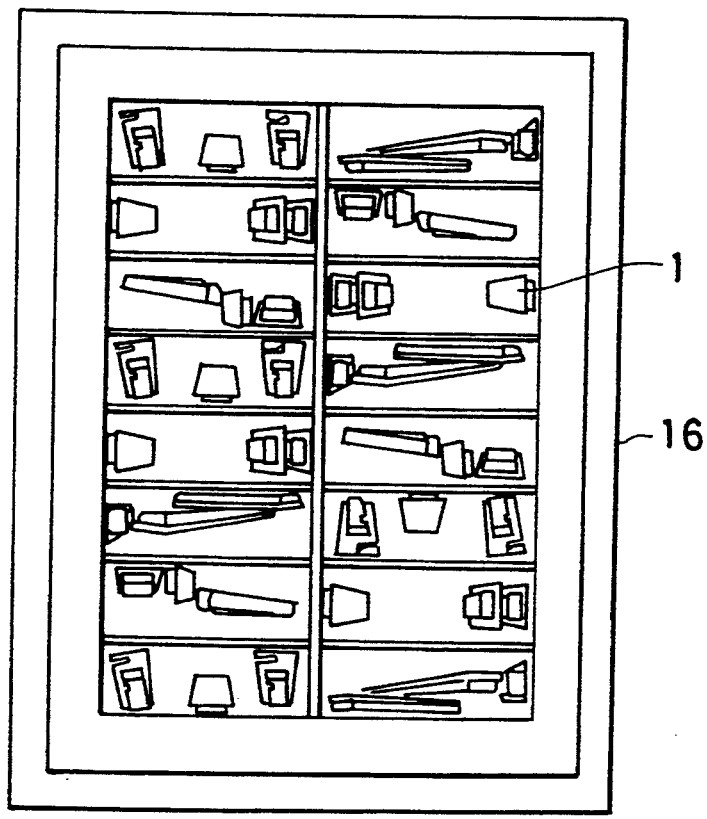
FIG. 41(A) is a plan view showing the goods of FIGS. 40(A) and 40 (B) shifted to the reserve tank.
Figure 41B:
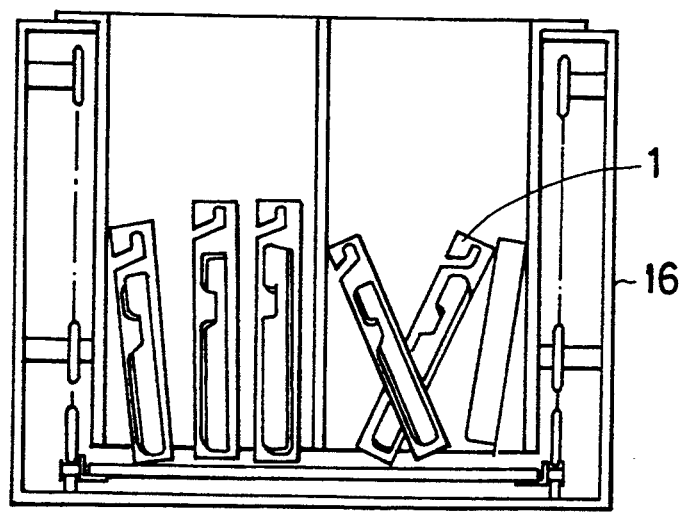
FIG. 41(B) is a front view thereof.

(1) Picking Operation (Step S1 in FIG. 33)

①  When an order (picking data per container 21) is sent to the picking control device, the picking control device issues picking instructions to the drop-out device 17 (Step S1-1).

②  In accordance with the picking instructions, the drop-out device 17 opens the shutter device 72 in the storage box 74 unit, and discharges (picks) the goods 1 which are stored in the storage box 74 (Step S1-2).

③  The drop-out device 17 repeats the procedure of above ②, and when goods 1 have been completely discharged from all storage boxes 74, the picking control device confirms the fact that the shutter device 72 of the drop-out device 17 is shut and issues supplying instructions to the reserve tank (Step S1-3).

④  The reserve tank 16 opens the integral shutter device 71 and supplies the goods I stored in the storage box 73 to the storage box 74 of the drop-out device 17 (Step S1-4).

⑤  When the supplying operation has been completed (the integral shutter device 71 of the reserve tank 16 is shut), the drop-out device 17 continues its operation for picking the goods 1 (Step S1-5).

(2) Collecting/Feeding Operation (Step S2)

①  The goods 1 which have been discharged from the drop-out device 17 are received on the collecting conveyor 18 and are collected by the shoot conveyor 19 (Steps S2-1 and S2-2).

②  When the container 21 requiring the goods 1 which have been collected by the shoot conveyor 19 arrives at the feeding portion of the shoot conveyor 19 through the container carrying line 15, the conveyor control device 154 causes the stopper 152 to be projected based on the reading result of the bar code reader 151 in order to stop the container 21 at the feeding portion and the goods 1 are feeding into the stopping container 21 (Steps S2-3, S2-4 and S2-5).

③  Upon completion of the feeding of the goods 1, the conveyor control device 154 permits the container 21 to start traveling. The container 21 passes the feeding portions of each picking apparatus 14 forming a total of first to fifth (i.e., five) units and receives all goods 1 to be fed therein.

(3) Shifting Operation to Reserve Tank (Step S3)

①  When no goods 1 remain in the storage box 73 of the reserve tank 16 as a result of the procedure of above (1) ④, the picking control device causes the shifting requirement indicator 70 and the shifting goods indicator 69 disposed in the reserve tank 16 and a storing space of the gravity flow rack 13 to blink in order to inform the worker of the instructions to shift goods 1 from the gravity flow rack 13 to the reserve tank 16 (Steps S3-1 and S3-2).

As the reserve tanks 16 and the storing spaces of the gravity flow rack 13 are opposite to each other, the shifting requirement indicator 70 and the shifting goods indicator 69 are not necessarily required to both be on.

②  In accordance with the blinking shifting goods indicator 69 and shifting requirement indicator 70, the worker takes out the case 20 from the storing space of the gravity flow rack 13 (a case take-out operating button 68 is depressed, then the case 20 is taken out onto the case receiving table 62 and thereafter the goods 1 contained in the case 20 are taken out) and shifts the goods 1 to the storage box 73 of the corresponding reserve tank 16 (Steps S3-3 and S3-4).

The unit for storing the goods 1 in one of the storage boxes 73 of the reserve tank 16 is a minimum picking unit (minimum, transaction unit) and is set such that integral multiples of the storage box 73 to be used this time are equal to the number of goods 1 contained in the case 20. Accordingly, the goods 1 are charged into each storage box 73 in equal number in units of a case 20. If all goods 1 for one case have been stored in a part of storage boxes 73 in the reserve tank 16, the remaining storage boxes 73 in the reserve tank 16 remain unused. Also, a seal, etc. with a printing of the number of goods to be charged into a single storage box 73 may be attached to the reserve tank 16.

③  When the goods 1 are to be shifted onto the inner side reserve tank 16, by pulling the handle 138 of the reserve tank 16, the reserve tank 16 is pulled out so as to approach the gravity flow rack 13 side, so that the shifting operation from the gravity flow rack 13 can be carried out without difficulties.

④  Upon completion of the shifting to the reserve tank 16, the worker depresses the shifting requirement indicator (illumination type push button) 70 of the reserve tank 16 in order to inform of the completion of the shifting to the picking control device. The shifting goods indicator 69 and the shifting requirement indicator 70 are also extinguished.

The completion of the shifting to the inner side reserve tank 16 may be automatically detected by detecting the fact that the reserve tank 16 has been pushed back to the original position above the inner side drop-out device 17 using a detector or the like (Step S3-5).

(4) Supplying Operation to Gravity Flow Rack (Step S4)

①  The storage quantity of the case 20 per each storing space of the gravity flow rack 13 is known by the picking control device or a host control CPU (central processing unit not shown) and the storage quantity of the case 20 is reduced every time the shifting of the goods 1 to the reserve tank 16 is completed. When the picking control device or the host control CPU confirms the generation of an empty space large enough to store, for example, one plane unit of cases 20 on the free conveyor 61, a supplying requirement of the cases 20 corresponding to the storing space of the gravity flow rack 13 is sent out to a case supplying control device (not shown) (Steps S4–1 and S4–2).

② In accordance with a supplying requirement to the gravity flow rack 13, the case supplying control device carries out a corresponding case 20 from storage facilities such as an automatic warehouse where cases 20 are stored in a pallet unit, then depalletized by a depalletizer, etc. and feeds cases 20 of one plane unit to the case feed line 11 (Step S4–3).

③ The case 20 fed to the case feed line 11 is fed to a corresponding storing space of the gravity flow rack 13 by the stacker crane 41 of the case supplying device 12 and stored (Steps S4–4, S4–5 and S4–6).

Next, the function of the picking system 10 will be described.

① A plurality of goods 1 arranged at random or in predetermined rows in a case 20, such as a corrugated fiberboard box and a plastic container, are stored in the reserve tank 16 having a plurality of storage boxes 73 arranged in two rows and n lines. After those goods 1 have been shifted to the drop-out device 17 having a plurality of storage boxes 74 arranged likewise in two rows and n lines so as to correspond to the storage boxes 73 of the reserve tank 16, the shutter 104 of each storage box 74 is opened and shut by the shutter device 72 which is disposed along the side surface portion of the drop-out device 17, and the goods 1 which have already been shifted to the storage box 74 are discharged in storage box 74 unit.

Accordingly, by storing the plurality of goods 1, which were stored in the case 20, in respective storage boxes 73 and 74 of the reserve tank 16 and the drop-out device 17, those goods 1 can be automatically picked out by a desired number simply by storing the goods 1 in the storage boxes 73 and 74 irrespective of the arrangement of the goods 1 in the case 20.

More specifically, the goods 1 depicted in FIGS. 34 through 41 are difficult to be automatically taken out of the case 20 by a handling instrument, but they can be easily taken out of the case 20 by manpower. Therefore, if the goods 1 are mannually shifted to the reserve tank 16 by manpower, the goods 1 which are already shifted to the storage box 73 of the reserve tank 16 are automatically picked by a desired number per each kind of goods 1 by the drop-out device 17 and assorted and assembled in the container 21. That is, in the case of goods 1 having a cap attached with a sprayer as shown in FIGS. 34(A) and 34(B), as the sprayer 1A is overlapped with the adjacent sprayer 1A, it is difficult to automatically take out a desired number of goods 1 from the case 28. However, simply by manually shifting the goods 1 to the reserve tank 16 by manpower as shown in FIGS. 35(A) and 35(B), the goods 1 can be automatically picked out by a desired number each time. FIG. 35(A) shows a state in which one piece of goods 1 is stored in each storage box 73, while FIG. 35(B) shows a state in which two are stored in each storage box 73. In this way, it is preferable that goods 1 are divided and stored in a minimum quantity (minimum transaction unit) required for each picking. FIG. 35(C) is a front view corresponding to FIGS. 35(A) and 35(B), respectively. In the case of goods 1 having a premium merchandise attached thereto as shown in FIGS. 36(A) and 36(B), the arrangement of goods 1, 1, . . . are easily disordered in the case 20. If the arrangement of the goods 1 is disordered in the case 20, it is difficult to take them out automatically. In this case, simply by manually shifting with manpower as shown in FIGS. 37(A) and 37(B), a desired number of goods 1 can be automatically picked up. Similarly, also in case of goods 1 inserted in a tray 1C as shown in FIGS. 38(A) and 38(B) or goods 1 stored in an inner box 1D as shown in FIGS. 40(A) and 40(B), goods 1 are difficult to be taken out automatically. However, simply by shifting them with manpower as shown in FIGS. 39(A) and 39(B) or FIGS. 41(A) and 41(B), goods 1 can be automatically picked up by a desired number each time. It goes without saying that the goods which can be handled with a method and an apparatus of the present invention are not limited to the above-mentioned goods which cannot be automatically taken out.

Also, the actuator 105 constituting the shutter device 72 of the drop-out device 17 can be mounted compactly to both side walls in the storage box assembly 101 of the drop-out device 17 and the construction thereof can thus be simplified. Accordingly, a plurality of reserve tanks 16 and drop-out devices 17 can be arranged in rows in parallel relation in a narrow space and there can be achieved a saving of space for the picking apparatus 14. The storage boxes 73 and 74 of the reserve tank 16 and the drop-out device 17 may be arranged in one row and n lines.

② By shifting the goods 1 stored in the gravity flow rack 13 to the reserve tank 16 which has been moved toward the gravity flow rack 13 side, the shifting work of goods 1 can be performed with ease.

That is, (a) as the goods 1 are stored in a storing space of the gravity flow rack 13 opposite to the reserve tank 16, the worker does not have to look for a storing space from where the goods 1 as shifting objects are to be taken out, (b) by pulling out the inner side reserve tank 16 toward the gravity flow rack 13 side, the goods 1 can be shifted through a short moving distance, (c) as vertically two stage reserve tanks 16 are arranged in a step in such a manner as to be adjacent to the gravity flow rack 13, the shifting work of the goods 1 can be performed from one side of the gravity flow rack 13 and therefore, the working range of the worker can be minimized, (d) the worker can perform the shifting work of the goods 1 in accordance with the instructions of the shifting goods indicator 69 and the shifting requirement indicator 70, and no skill is required, and (e) as the reserve tanks 16 can be arranged in two stages in the forward and backward direction, installation space thereof can be saved.

As the sizes of the storage boxes 73 and 74 can be changed by properly selecting the slits 90C and 127 into which the partitions 90D and 128 are to be inserted, the storage boxes 73 and 74 can be formed in accordance with the size and configuration of each goods, and many kinds of goods can be effectively stored and can be taken out reliably.

③ The goods 1 discharged from the drop-out device 17 are received by the collecting conveyor 18 in their scattered states and the goods 1 which have been discharged in such a manner as to be scattered on the collecting conveyor 18 can be initially assorted and assembled on the shoot conveyor 19, and therefore the goods 1 can be efficiently assorted and assembled.

Also, the goods 1 to be discharged from each of the plurality of drop-out devices 17 are fed to the collecting conveyor 18 in their scattered states, and the scattered goods 1 can be densely collected due to a difference between the carry-out transfer speed of the collecting conveyor 18 and the collecting transfer speed of the shoot conveyor 19. Accordingly, the goods 1 scattered on the collecting conveyor 18 can be collected onto the shoot conveyor 19 with no damage.

Figure 28:
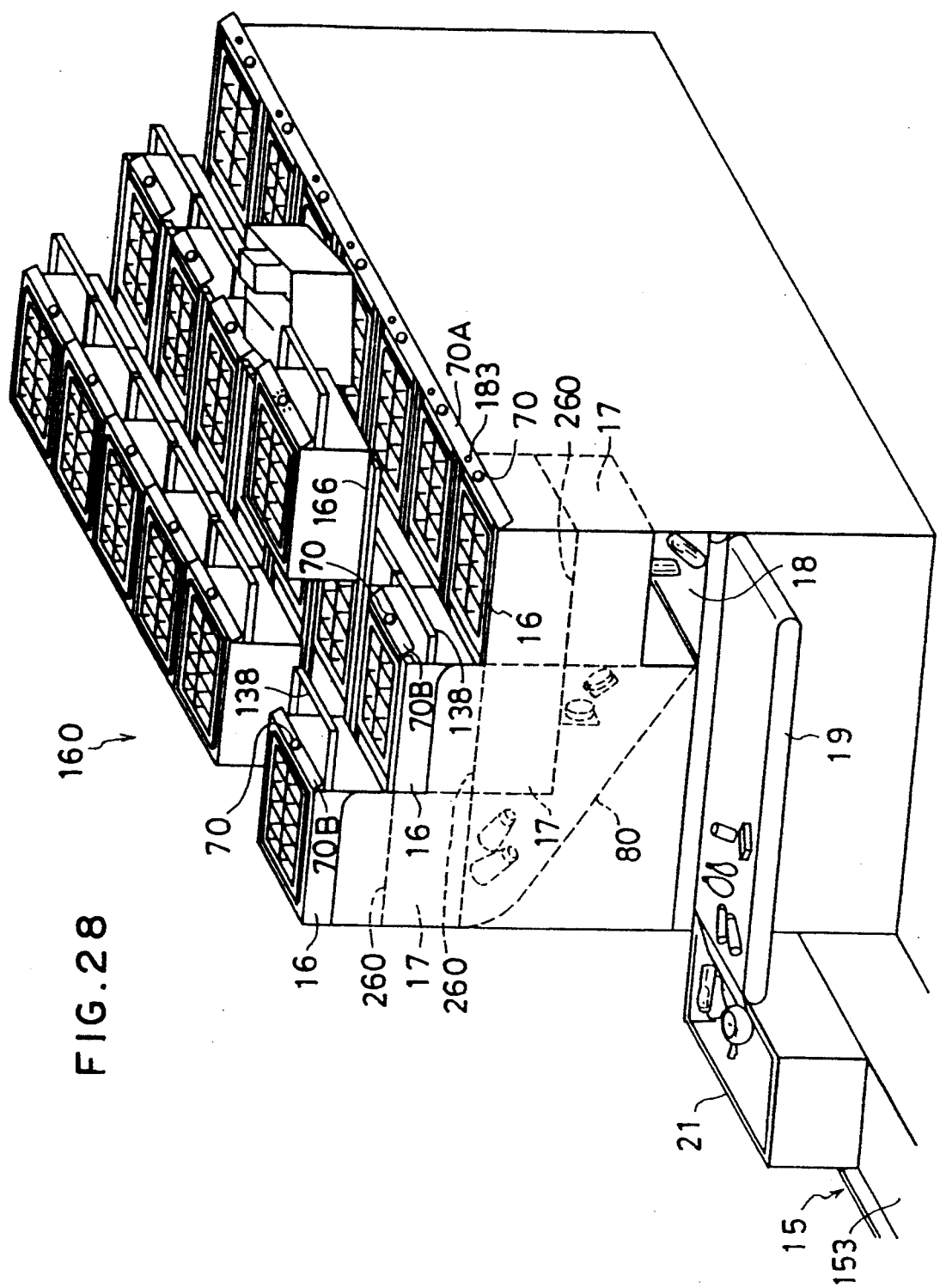
FIG. 28 is a perspective view showing a three stage type picking apparatus.

FIGS. 28 through 30 show an embodiment relating to a three stage type picking apparatus 160, in which each goods take-out position 160 forming three steps, i.e., this side (i.e. outer side) position, middle position and inner side position are provided with the reserve tank 16 and drop-out device 17 vertically stacked up in a layered structure. Free rollers 161 are provided to the intermediate reserve tank 16 and are movable forwardly and backwardly along guide rails 162 and 163 disposed on upper surfaces of both sides of the intermediate drop-out device 17 and the this side (i.e. outer side) reserve tank 16. Free rollers 164 are provided to the inner side reserve tank 16 and are movable forwardly and backwardly along a guide rail 165 disposed on upper surfaces of both sides of the inner drop-out device 17 and a slide type guide rail 166 built in the upper surface of the intermediate reserve tank 16.

The slide type guide rail 166, as shown in FIGS. 30(A) and 30(B), has a slider frame 167, a slide portion 168 of which is supported by a support roller 169 disposed at an upper end of a front inner surface of the reserve tank body 91 of the intermediate reserve tank 16 in a roll contact state, upper and lower free rollers 171 and 172 disposed at upper and lower places of a rear end portion of the slider frame 167 being supported by upper and lower guide rails 173 and 174 oriented in the forward and backward direction of an upper end portion of the reserve tank body 91 in a roll contact state. The front and rear free rollers 164 of the inner side reserve tank 16 are capable of moving the guide rail 165 disposed at the inner side drop-out device 17 and a guide rail portion 175 disposed at an upper surface of the slide type guide rail 166. A front end portion of the front free roller 164 of the inner side reserve tank 16 and a front end portion of the slider frame 167 respectively are provided with a reserve tank 16 side stopper 176 and a slider frame 167 side stopper 177. When the inner side reserve tank 16, which has been pulled out from an upper position of the inner side drop-out device 17 toward the slide type guide rail 166 side, is further pulled out, the reserve tank 16 is brought to be integral with the slide type guide rail 166 in the pull-out direction owing to engagement between the two stoppers 176 and 177, so that the slide type guide rail 166 can be pulled out along the upper and lower guide rail portions 173 and 174 which are disposed at the reserve tank body 91 of the intermediate reserve tank 16 (see FIGS. 29(A)). At that time, the slide type guide rail 166 is supported by the reserve tank body 91 of the intermediate reserve tank 16 in a cantilever fashion owing to engagement between the free rollers 171, 172 and the guide rail portions 173, 174, and engagement between the slide portion 168 and the support roller 169, and pulled out together with the inner side reserve tank 16.

A rear end portion of the slider frame 167 is provided with a slider frame 187 side stopper 178, while a front end portion of the upper guide rail portion 173 disposed at the reserve tank body 91 of the intermediate reserve tank 16 is provided with a reserve tank 16 side stopper 179, so that when the slide type guide rail 166 is pulled out, the stopper 178 is brought into engagement with the stopper 179, thereby to restrict the pull-out limit position of the slide type guide rail 166. Also, a rear end portion of the upper guide rail portion 173 disposed at the reserve tank body 91 of the intermediate reserve tank 16 is provided with a reserve tank 16 side stopper 180 hanging down therefrom, so that when the slide type guide rail 166 is pushed back, the upper free roller 171 disposed at the slider frame 167 touches the stopper 180, thereby to restrict the push-back limit position of the slide type guide rail 166.

Also, a lower guide rail portion 174 disposed at the reserve tank body 91 of the intermediate reserve tank 16 is provided with an original position holding stopper 181 into which the lower roller 172 disposed at a rear end portion of the slider frame 167 drops. Also, the guide rail portion 175 disposed at the slide type guide rail 166 is provided with a pull-out position holding stopper 182 by which the front free roller 164 of the inner side reserve tank 16 is held at the pull-out position when it is moved thereover.

In the above-mentioned three stage type picking apparatus 160, if it is not possible for the worker to reach his hand to the 138 handle of the inner side reserve tank 16, the reserve tank 16 may be moved using a driving means (not shown) such as motor, cylinder, etc. At that time, to move the inner side reserve tank 16, the driving means may be designed such that the driving means is actuated by depressing a tank pull-out button 183 disposed at the indicator mounting member 70A for the reserve tank 16 on this (i.e. outer) side and the shifting requirement indicator 70. That is, while the tank pull-out button 183 is being depressed, the reserve tank 16 travels to this (outer) side, and when the pull-out button 183 is left untouched, the reserve tank 16 is stopped. When the shifting requirement indicator 70 is depressed after the goods 1 have been shifted from the gravity flow rack 13 to the reserve tank 16, the reserve tank 16 is returned to its original position.

Figure 31:
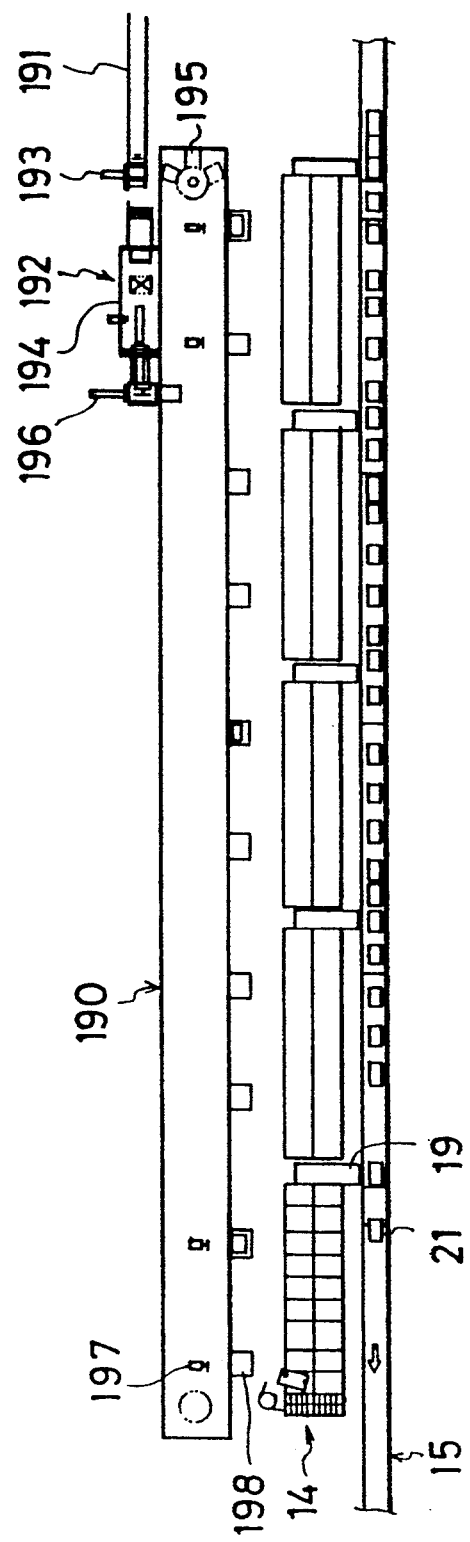
FIG. 31 is a plan view showing a picking system according to another embodiment of the present invention.

FIG. 31 shows another embodiment in which the gravity flow rack 13 in the picking system 10 of FIG. 1 is replaced with a carousel 190. In this embodiment, the picking apparatus 14 and the container carrying line 15 have the same construction as in the above-mentioned picking system 10.

In the carousel 190, the case 20 to be fed to a case 20 feed line 191 is fed by a case supplying device 192. The case supplying device 192 includes a case turner 193 for turning a case 20 which has been fed to the case feed line 191, a lifting machine 194 for raising and lowering the case 20 which has been turned by the case turner 193 so that the case 20 is brought to be coincident with a level of a supplementary storing space of the carousel 190 formed in a multistage manner in the vertical direction of the carousel 190, and a pusher 196 for pushing the case 20, which has been raised and lowered by the lifting machine 194, into a tray 195 located in the supplementary storing space of the carousel 190. The carousel 190 is equipped with two pushers 197 per each corresponding unit of the picking apparatus 14 which are formed in five units in total as mentioned previously. Owing to the foregoing arrangement, the carousel 190 is capable of pushing out the case 20 containing shift required goods 1 to a case take-out port 198 corresponding to the shift required picking apparatus 14 through activation of each pusher 197. The worker shifts the goods 1 contained in the case 20 which has been pushed out into the case take-out port 198 to the reserve tank 16 of the picking apparatus 14. The goods 1, which have been shifted from the carousel 190 to the reserve tank 16 of the picking apparatus 14, are picked up and fed to the container 21 on the container carrying line 21 as in the picking system 10 of FIG. 1.

The present invention is not limited to the above-mentioned embodiment. The goods 1 may be shifted to the reserve tank 16 in units of a plurality of cases 20, or the goods 1 may be shifted to the reserve tank 16 in units of less than 20 cases each time.

Also, the system may be designed such that the integral shutter device 71 of the reserve tank 16 is changed to the shutter device 72 and the drop-out device 17 is omitted.

Still further, the system may be designed such that the reserve tank 16 is omitted and the goods 1 are directly shifted to the drop-out device 17.

As described in the foregoing, according to the present invention, by shifting a plurality of goods contained in the container to a goods storage device having a plurality of goods storage sections which are arranged in no more than two rows, there can be obtained a goods handling method and apparatus, in which goods can be taken out by a desired number each time, and also by providing the pivot shaft of the shutters in the vicinity of the lower end portion of a side surface of the goods drop-out device, the shutters for opening and shutting the goods storage sections and actuators for actuating the shutters can be simplified in construction, and as a result, a plurality of goods storage devices and goods drop-out devices can be arranged, side by side, in rows in a narrow space and the installation space can be saved.

Similarly, according to other features of the invention, there can be obtained a goods handling method and apparatus, in which by shifting goods stored in the storage apparatus toward the goods take-out device which has been moved to the goods storage apparatus side, goods shifting work can be performed with ease.

Likewise, according to another feature of the invention, by properly selecting the engaging position of the partition, the sizes of the goods storage sections can be changed. Accordingly, there can be formed the goods storage sections in accordance with the sizes, configurations, etc. of the goods, and many kinds of goods can be efficiently stored and reliably taken out.

What is claimed is:

1. A method of handling goods (1) with a machine having a storage apparatus (13) that holds a container (20) in which the goods (1) are placed in a given arrangement and a goods take-out device (16), the goods take-out device (16) being provided with storage boxes (73) arranged in a first matrix, the goods take-out device (16) being spaced from the storage apparatus (13) and movable between a first position spaced from the storage apparatus (13) and a second position horizontally closer than the first position to the storage apparatus (13) such that the second position serves to facilitate shifting of goods (1) from the storage apparatus (13) to the goods take-out device (16) due to a shortened distance therebetween, said method comprising the steps of:

(a) when the goods take-out device (16) is empty, moving such device (16) to the second position;
   (b) shifting the goods (1) from the container (20) to load said goods take-out device (16);
   (c) returning the loaded goods take-out device (16) to the first position;
   (d) shifting the goods (1) from such device (16) to a goods drop-out device (17) directly below the goods take-out device (16), the goods drop-out device (17) having storage boxes (74) arranged in a second matrix identical to the first matrix; and
   (e) discharging goods (1) from selected storage boxes (74) of said goods drop-out device (17);

characterized by moving the goods take-out device (16) horizontally between the first and second positions and by selecting the sizes and positioning of the storage boxes of both the goods take-out device (16) and the goods drop-out device (17) from one of a plurality of predetermined arrangements, including the given arrangement.

2. A goods handling apparatus, comprising:

a storage apparatus (13) that retains a container (20) in which goods (1) are placed in a given arrangement; and a goods picking device (14) which includes a goods take-out device (16) spaced from the storage apparatus (13) for receiving goods (1) transferred from a container (20) and being adapted to be movable between a first position and a second position, said second position being horizontally closer than the first position to the storage apparatus (13), and a goods drop-out device (17) which is adapted to receive goods (1) from said goods take-out device (16) and to discharge said goods (1) therefrom, the goods drop-out device (17) being located directly below the goods take-out device (16) when the goods take-out device (16) is in the first position;

characterized in that the said goods take-out device (16) is movable horizontally between said first and second positions and includes first storage boxes (73) arranged therein in a first matrix; said goods drop-out device (17) includes a plurality of second storage boxes (74) arranged therein in a second matrix which is identical to the first matrix; and in that the sizes and positioning of the storage boxes (73, 74) of both the goods take-out device (16) and the goods drop-out device (17) are variable and are selected from one of a plurality of predetermined arrangements.

3. A goods handling apparatus as defined in claim 2, wherein said storage boxes (73, 74) are formed by partitions (90D, 128) which are detachably engaged with partition walls (90A, 90B, 126) of the respective take-out (16) or drop-out (17) device, said partition walls (90A, 90B, 126) including a plurality of engaging portions (90C, 127) adapted to engage with edges of said partition walls (90A, 90B, 126), the sizes of the storage boxes (73, 74) being variable by inserting partitions (90D, 128) into selected ones of said engaging portions (90C, 127); and said goods take-out device (16) or said goods drop-out device (17) further includes respective shutter means for opening selected ones of said respective storage boxes (73, 74) in order to discharge goods (1) stored therein.

4. A goods handling apparatus as defined in claim 3, wherein said shutter means Of said goods drop-out device (17) comprises:

a plurality of shutters (104) each mounted on a respective pivot shaft (103), each pivot shaft (103) being disposed at a lower end portion of a side wall of said goods drop-out device (17); and a plurality of actuators (105) each coupled to a respective shutter (104) for moving said shutters (104) to open the respective storage box (74), each actuator (105) being disposed on a side wall of said goods drop-out device (17).

5. A goods handling apparatus as defined in claim 2, wherein said goods take-out device (16) or said goods drop-out device (17) further includes respective shutter means for opening selected ones of said respective storage boxes (73, 74) in order to discharge goods (1) stored therein, said shutter means of said goods drop-out device (17) comprising:
- a plurality of shutters (104) each mounted on a respective pivot shaft (103), each pivot shaft (103) being disposed at a lower end portion of a side wall of said goods drop-out device (17); and
- a plurality of actuators (105) each coupled to a respective shutter (104) for moving said shutters (104) to open the respective storage box (74), each actuator (105) being disposed on a side wall of said goods drop-out device (17).

6. A goods handling apparatus as defined in claim 2, wherein said goods picking device (14) further comprises a first goods take-out device (16) and at least one further goods take-out device (16), and a first goods drop-out device (17) and at least one further goods drop-out device (17), said further goods take-out device (16) being located in a stepped configuration relative to said first goods take-out device (16) when said further goods take-out device (16) is in the first position.

7. A goods handling apparatus as defined in claim 6, wherein said storage boxes (73, 74) are formed by partitions (90D, 128) which are detachably engaged with partition walls (90A, 90B, 126) of at least one of the first and further take-out devices (16) or at least one of the first and further drop-out devices (17), said partition walls (90A, 90B, 126) including a plurality of engaging portions (90C, 127) adapted to engage with edges of said partition walls (90A, 90B, 126), the sizes of the storage boxes (73, 74) being variable by inserting partitions (90D, 128) into selected ones of said engaging portions (90C, 127); and said at least one of said first and further goods take-out devices (16) or said at least one of said first and further goods drop-out devices (17) further include respective shutter means for opening selected ones of said respective storage boxes (73, 74) in order to discharge goods (1) stored therein.

8. A goods handling apparatus as defined in claim 6, wherein at least one of said first and further goods take-out devices (16) or at least one of said first and further goods drop-out devices (17) further include respective shutter means for opening selected ones of said respective storage boxes (73, 74) in order to discharge goods (1) stored therein, said shutter means of said at least one of said first and further goods drop-out devices (17) comprising:
- a plurality of shutters (104) each mounted on a respective pivot shaft (103), each pivot shaft (103) being disposed at a lower end portion of a side wall of such goods drop-out device (17); and
- a plurality of actuators (105) each coupled to a respective shutter (104) for moving said shutters (104) to open the respective storage box (74), each actuator (105) being disposed on a side wall of such goods drop-out device (17).

9. A goods handling apparatus as defined in any one of claims 2-8, wherein there are no more than two rows in said first matrix and said second matrix.

* * * * *